United States Patent
Carney

(10) Patent No.: US 12,281,242 B2
(45) Date of Patent: Apr. 22, 2025

(54) ADHESIVE FOR CASTABLE URETHANES

(71) Applicant: LORD Corporation, Cary, NC (US)

(72) Inventor: Brian P. Carney, Erie, PA (US)

(73) Assignee: LORD Corporation, Cary, NC (US)

( * ) Notice: Subject to any disclaimer, the term of this patent is extended or adjusted under 35 U.S.C. 154(b) by 671 days.

(21) Appl. No.: 17/298,442

(22) PCT Filed: Dec. 3, 2019

(86) PCT No.: PCT/US2019/064103
§ 371 (c)(1),
(2) Date: May 28, 2021

(87) PCT Pub. No.: WO2020/117722
PCT Pub. Date: Jun. 11, 2020

(65) Prior Publication Data
US 2022/0025227 A1   Jan. 27, 2022

Related U.S. Application Data

(60) Provisional application No. 62/774,398, filed on Dec. 3, 2018.

(51) Int. Cl.
C09J 151/08 (2006.01)
C08J 5/12 (2006.01)
C09J 5/00 (2006.01)

(52) U.S. Cl.
CPC ............. *C09J 151/08* (2013.01); *C08J 5/125* (2013.01); *C09J 5/00* (2013.01); *C08J 2375/04* (2013.01); *C08J 2451/08* (2013.01); *C08J 2475/04* (2013.01); *C09J 2400/166* (2013.01); *C09J 2451/00* (2013.01); *C09J 2475/00* (2013.01); *C09J 2475/008* (2013.01)

(58) Field of Classification Search
None
See application file for complete search history.

(56) References Cited

U.S. PATENT DOCUMENTS

| | | | |
|---|---|---|---|
| 4,395,528 A | 7/1983 | Leiner et al. | |
| 5,266,611 A * | 11/1993 | Teschendorf | C09J 5/02 523/423 |
| 2010/0059179 A1* | 3/2010 | Tribelhorn | C09J 5/02 156/314 |
| 2012/0138345 A1 | 6/2012 | Amou | |
| 2018/0244965 A1 | 8/2018 | Mowrey et al. | |
| 2018/0298253 A1 | 10/2018 | Bal et al. | |
| 2019/0047041 A1 | 2/2019 | Ladegourdie | |
| 2020/0024493 A1* | 1/2020 | Kuwahara | C09J 133/10 |

FOREIGN PATENT DOCUMENTS

| | | | |
|---|---|---|---|
| CN | 108138021 A | 6/2018 | |
| JP | 2002097443 A | 4/2002 | |
| JP | 2018/070770 A | 5/2018 | |
| JP | 2018134826 * | 7/2018 | |
| WO | WO-2017053402 A1 * | 3/2017 | ....... B29C 45/14311 |
| WO | 2017100750 A1 | 6/2017 | |
| WO | WO-2018152489 A1 * | 8/2018 | .............. B01J 23/06 |
| WO | WO 2020/117722 A1 | 6/2020 | |

OTHER PUBLICATIONS

JP2018134826 Foreign Priority Document—Machine Translation, prepared Jul. 27, 2024. (Year: 2024).*
Chinese Office Action for Application No. 201980090284 dated Jun. 22, 2022.
Indian Office Action for Application No. 202117025923 dated Dec. 8, 2021.
International Search Report and Written Opinion for Application No. PCT/US2019/064103 dated Mar. 3, 2020.
Database WIP week 201834, Thomson Scientific, London, GB; AN 2018-362346, XP002798017.
Chinese Office Action for Application No. 201800902849 dated Apr. 23, 2023.
Chinese Office Action for Application No. 2019800902849 dated Dec. 2, 2022.
Chinese Office Action for Application No. 202080053601 dated Sep. 5, 2022.
Chinese Office Action for Application No. 202080053601 dated Mar. 30, 2023.
Chinese Office Action for Application No. 202080053601 dated Nov. 8, 2023.
European Office Action for Application No. 20754523 dated Jun. 1, 2023.
European Office Action for Application No. 20754523 dated Jan. 2, 2024.
Indian Office Action for Application No. 202217001623 dated Apr. 8, 2022.
Indian Office Action for Application No. 202217001623 dated Nov. 3, 2022.
International Search Report and Written Opinion for Application No. PCT/US2020/043388 dated Oct. 6, 2020.

* cited by examiner

*Primary Examiner* — Christopher M Rodd
(74) *Attorney, Agent, or Firm* — KDW FIRM PLLC

(57) ABSTRACT

Provided are adhesives containing a phenoxy resin grafted with methyl methacrylate (MMA) and/or methacrylic acid (MAA), and including a uretdione or a silane. The adhesive compositions are completely or substantially absent free isocyanate. The grafted phenoxy resin forms crosslinking which allows the adhesive to chemisorb to a metal surface, diffuse and entangle in a urethane elastomer and/or provide crossbridging and/or crosslinking across an interface of the adhesive and a cast urethane. Methods of adhering a castable urethane to a substrate, using the provided adhesives, are also provided.

23 Claims, 3 Drawing Sheets

Castable Urethane

| Name | Chemistry | Cure | Post Cure |
|---|---|---|---|
| 1-Shore A 95 | TDI/Polyether/MOCA | 100°C 20 min | 100°C 16 hrs |
| 2-Shore A 85 | TDI/Polyether/MOCA | 100°C 40 min | 100°C 16 hrs |
| 3-Shore A 95 | TDI/Polyester/MOCA | 100°C 20 min | 100°C 16 hrs |
| 4-Shore A 85 | TDI/Polyester/MOCA | 100°C 30 min | 100°C 16 hrs |
| 5-Shore A 85 | MDI/Polyester/1,4 butanediol | 110°C 60 min | 100°C 16 hrs |
| 6-Shore A 85 | MDI/Polyether/1,4 butanediol | 110°C 60 min | 100°C 16 hrs |
| 7-Shore A 90 | MDI/Polyether/MDA salt | 127°C 30 min | 140°C 16 hrs |
| 8-Shore A 90 | MDI/Polycaprolactoneether/MDA salt | 127°C 30 min | 140°C 16 hrs |

Fig. 3

ADHESIVE FOR CASTABLE URETHANES

CROSS-REFERENCE TO RELATED APPLICATIONS

This application claims benefit of U.S. Provisional Patent Application Ser. No. 62/774,398, filed Dec. 3, 2018, herein incorporated by reference in its entirety.

TECHNICAL FIELD

Provided herein are adhesives for castable urethanes. More particularly, in some aspects disclosed are one-part adhesives for bonding castable urethanes to rigid substrates that require no heat treatment/prebake and are particularly well suited for high temperature applications.

BACKGROUND

Castable urethanes are two-part urethane mixtures with an A-side comprising a liquid urethane prepolymer with a known percentage of isocyanate, a B-side comprising a hydroxyl or amine type curative, and optionally catalysts, fillers, plasticizers, degassing agents, stabilizers, antioxidants, colorants, and the like. Castable urethanes are easy to use and process (i.e., mix, pour and/or cure) and have desirable properties such as abrasion resistance, oil resistance, rear and cut resistance, and can bear high loads. This makes them particularly well suited for use in wheels, rollers, bumpers, mining and oilfield equipment, etc.

To form these parts made of castable urethane, a rigid substrate is coated with an adhesive, then placed in a mold and the 2-parts of the urethane are mixed and introduced into the mold to surround/coat the rigid substrate. As the urethane cures, the adhesive bonds the urethane to the rigid substrate.

The current industry trend for castable urethanes involves high heat applications (excursions from 250° F. to 300° F., not continuous high heat due to polyurethanes obvious vulnerability at those temperatures in sustained conditions). Current market-leading cast urethane adhesives use 2-part systems based on polymeric isocyanates. These have limited pot life and are hard to work with due to the large amount of free isocyanate. In addition, these adhesives require a substantial prebake (i.e., full bonding temperature 250-285° F., 1 to 24 hour prebake) to achieve metal bonding and build crosslink density before molding and curing.

There is a long-felt need for more effective and user friendly adhesives for castable urethane products. Such need is addressed with the presently disclosed subject matter.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, provided herein are adhesives comprising a phenoxy resin grafted with methyl methacrylate (MMA) and/or methacrylic acid (MAA), and further comprising a uretdione or a silane. The silane can comprises any suitable silane composition, including for example at least one of an epoxy-, amino-, mercapto-, and/or isocyanato-silane. In some preferred embodiments, the silane can comprise glycidoxy propyltrimethoxy silane. Alternatively, or in addition, the uretdione can comprise a uretdione of methylene diphenyl diisocyanate (MDI). In some embodiments, the disclosed adhesive compositions can be completely or substantially absent free isocyanate.

In some aspects, in the disclosed adhesive compositions, the phenoxy resin grafted with MMA and/or MAA works with the uretdione or silane to form crosslinking. The adhesive can be configured to chemisorb to a metal surface, diffuse and entangle in a urethane elastomer and/or provide crossbridging and/or crosslinking across an interface of the adhesive and a cast urethane.

In some embodiments, the presently disclosed adhesives can be used to bond castable urethane to a substrate. In some aspects, such adhesives require no prebake to achieve 100% rubber, or substantially 100%, retention and greater than 150 PLI after hot testing at 300° F. for a 2-hour soak pulled hot in the hot box (ASTM D429 Method B).

In some embodiments, methods of adhering a castable urethane to a substrate are provided, and can comprise providing an adhesive as disclosed herein, providing a substrate, and applying the adhesive and castable urethane to the substrate.

Accordingly, it is an object of the presently disclosed subject matter to provide adhesives for castable urethanes and applications for using the same. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description, Drawings and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

FIG. 3 summarizes further castable urethane adhesives disclosed herein and tested, including those in Examples 3 and 4, and the conditions under which testing was done.

Figure 1:
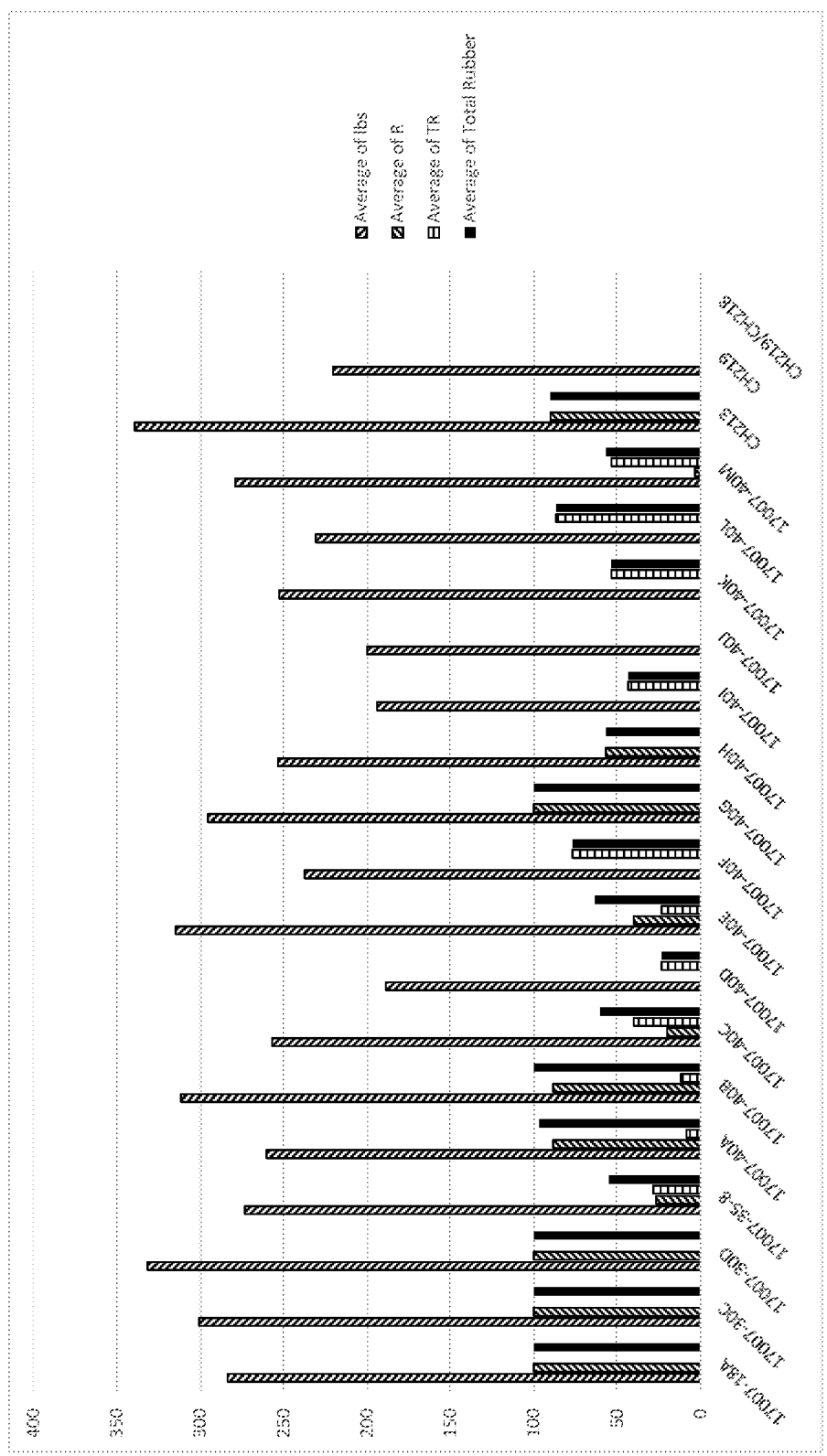
FIGS. 1 and 2 show the results of testing of castable urethane adhesives disclosed herein, using primary adhesion testing (FIG. 1) and hot tree testing (FIG. 2).

For a more complete understanding of the presently disclosed subject matter, reference is now made to the following drawings in which:

DETAILED DESCRIPTION

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

I. Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a component" includes a plurality of such components, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, sequence identity (e.g., when comparing two or more nucleotide or amino acid sequences), mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

II. Detailed Description

Provided herein are adhesives for castable urethanes. More particularly, in some aspects disclosed are one-part adhesives for bonding castable urethanes to rigid substrates that require no heat treatment/prebake and are particularly well suited for high temperature applications. The adhesives can in some embodiments contain a methacrylic acid (MAA) and/or methyl methacrylate (MMA) grafted phenoxy resin and an internally coordinated urethane (uretdione).

Castable urethanes are two-part urethane mixtures with an A-side comprising a liquid urethane prepolymer with a known percentage of isocyanate, a B-side comprising a hydroxyl or amine type curative, and optionally catalysts, fillers, plasticizers, degassing agents, stabilizers, antioxidants, colorants, and the like. Castable urethanes are easy to use and process (i.e., mix, pour and/or cure) and have desirable properties such as abrasion resistance, oil resistance, rear and cut resistance, and can bear high loads. This makes them particularly well suited for use in wheels, rollers, bumpers, mining and oilfield equipment, etc.

To form these parts made of castable urethane, a rigid substrate is coated with an adhesive, then placed in a mold and the 2-parts of the urethane are mixed and introduced into the mold to surround/coat the rigid substrate. As the urethane cures, the adhesive bonds the urethane to the rigid substrate.

The current industry trend for castable urethanes involves high heat applications (excursions from 250° F. to 300° F., not continuous high heat due to polyurethanes obvious vulnerability at those temperatures in sustained conditions).

Currently available cast urethane adhesives use two-part systems based on polymeric isocyanates. These have limited pot life and are hard to work with due to the large amount of free isocyanate. In addition, these adhesives require a substantial prebake (i.e., full bonding temperature 250-285° F., 1 to 24 hour prebake) to achieve metal bonding and build crosslink density before molding and curing.

The adhesives of the embodiments of the presently disclosed subject matter meet all of these challenges, including for example, comprising one-part formulations that have substantially no free isocyanates, a nearly infinite shelf-life, do not require a prebake, and are easy to use. They can be applied and dried, for example at about 200° F. for 15 minutes, then are ready to bond. Furthermore, the adhesive compositions provided herein can in some embodiments provide 100% rubber retention, or substantially 100% rubber retention, and about 160-190 PLI (ASTM D429 Method B) after hot testing at 300° F. for a 2-hour soak pulled hot in the hot box.

In some embodiments, the presently disclosed subject matter provides adhesives comprising grafted phenoxy resins. Phenoxy reins are commercially important thermoplastic polymers derived from bisphenols and epichlorohydrin. Their molecular weights are higher, i.e., at least about 45,000, than those of conventional epoxy resins, i.e., 8,000 maximum. They lack terminal epoxide functionality and are therefore thermally stable and can be fabricated by conventional thermoforming techniques. Phenoxy resins are prepared by reaction of high purity bisphenol A with epichlorohydrin in a 1:1 mole ratio. Solution polymerization may be employed to achieve the molecular weight and processability needed.

Phenoxy resins are preferred, in part, due to hydroxyl moieties on the backbone of the resin. These hydroxyl moieties are thought to provide increased chemisorption at the substrate interface (plastic or metal) in the form of hydrogen bonding and dispersive forces, in addition to allowing for increased diffusion across the elastomer or liquid plastic interface providing ample opportunities for covalent bonding in the form of crosslinking and entanglement during a curing process.

In one embodiment of the presently disclosed subject matter, an adhesive is provided comprising an MMA/MAA grafted phenoxy resin and a uretdione of MDI. In another embodiment, an adhesive is provided comprising an MMA/MAA grafted phenoxy resin and a silane. Moreover, in some embodiments, the MMA/MAA grafted phenoxy resin comprises a phenoxy resin grafted with MAA and MMA. See, e.g. Structure 1 below. Without being limited by any particular mechanism of action, grafting these moieties onto the phenoxy backbone increases the molecular weight of the polymer and provides additional functionality. A suitable example of a phenoxy resin that may be used in the presently disclosed subject matter includes, but is not limited to, a polymer of bisphenol "A", specifically, diglycidyl ethers of bisphenol "A", that has had carboxylic acid and methyl methacrylate grafted thereto. By way of example and not limitation, an MMA/MAA grafted phenoxy resin of this type is available from Gabriel Performance Products and sold as PKHS-27.

In a preferred embodiment of the presently disclosed subject matter, the phenoxy polymer is heavily grafted to the extent that the molecular weight has been doubled, or approximately doubled, from about 50,000 to about 100,000.

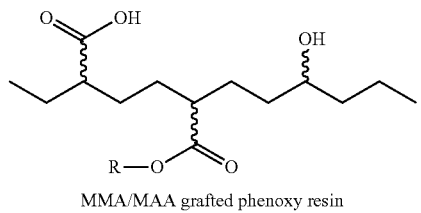

Structure 1

MMA/MAA grafted phenoxy resin

In some embodiments, the disclosed adhesives further comprises a blocked isocyanate, preferably a self-blocked isocyanate. Self-blocked isocyanates are also referred to as internally-blocked isocyanates and commonly comprise dimerized diisocyanates.

The uretdione of MDI is a particularly preferred example of an internally coordinated or self-blocked diisocyanate used in the presently disclosed compositions. Other such internally coordinated diisocyanates may be used, such as for example, a uretdione of isophorone diisocyanate, or a uretdione of toluene diisocyanate. An example of a uretdione of MDI is GRILBOND A2BOND available from EMS-Griltech (Switzerland), and an example of a uretdione of TDI is ADOLINK TT available from Rhein Chemie Rheinau GmBH (Mannheim, Germany).

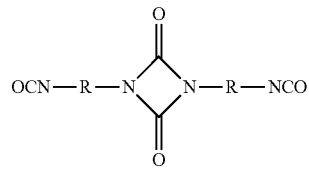

Structure 2

Uretdione of MDI (dimer), where R = body of MDI

In a further embodiment of the presently disclosed subject matter, at least one polyfunctional reactant is provided to enhance crosslinking of the adhesive and castable urethane. In a preferred embodiment of the presently disclosed compositions, the polyfunctional reactant comprises at least one of trimethylol propane or trimethylol ethane. See Structure 3 below.

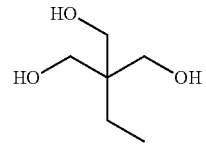

Structure 3

Trimethylol propane

In a further embodiment of the presently disclosed compositions, a metal catalyst is provided such as a metal acetylacetonate or bismuth catalyst. See, e.g. Structure 4 showing Aluminum acetylacetonate as an example. The metal catalyst is suitable if it is capable of catalyzing either the dissociation of the uretdione or the urethane reaction, or both. In a preferred embodiment, a metal acetylacetonate is employed. Other specific metal catalysts that may be employed comprise zinc carbonate (basic), zinc acetylacetonate, zinc acetate, copper acetylacetonate, iron acetylacetonate, nickel acetylacetonate, zinc acetate, zinc lactate, and copper acetate. Additionally, titanate catalysts including titanium acetylacetonate, 2-ethylhexyl titanium acetylacetonate and a titanium phosphate complex, as well as traditional titanium catalysts may be employed. Such suitable metal catalysts are generally described by Leiner and Bossert in U.S. Pat. No. 4,395,528, herein incorporated by reference.

Structure 4

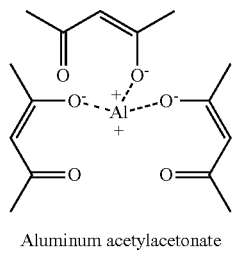

Aluminum acetylacetonate

In further embodiments, adhesive compositions can also comprise epoxy-, mercapto-, isocyanato-, and/or amino-silanes. In some aspects, addition of these materials can increase results in hot tear testing. In one embodiment, the silane comprises at least one of 3-Mercapto-propyltrimethoxy silane, 3-aminopropyltriethoxy silane, 3-isocyanatopropyltrimethoxy silane, aminopropyl-methyl-diethoxy silane, and/or combinations thereof.

In a preferred embodiment of the present disclosure, epoxy functional silanes are provided. Compounds suitable for use in the presently disclosed compositions include, but are not limited to, any epoxy functionalized silane compounds capable of reacting with the grafted phenoxy. See, e.g., the Glycidoxy propyltrimethoxy silane of Structure 5, below. By way of example and not limitation, suitable epoxy functional silane compounds include 3-glycidoxypropyltrimethoxysilane, 3-glycidoxypropyldimethoxysilane, 3-glycidoxypropyldimethylmethoxysilane, 2-(3,4-epoxycyclohexyl)-ethyltriemthoxysilane and the like. Such compounds are generally available commercially (for example, 3-glycidoxypropyltrimethoxysilane from Aldrich Chemical and 3-glycidoxypropyltrimethoxysilane and beta-(3,4-epoxycyclohexyl)-ethyltriemthoxysilane from Gelest Inc.) and many of such compounds are known in the literature and are obtainable by art-recognized procedures.

Structure 5

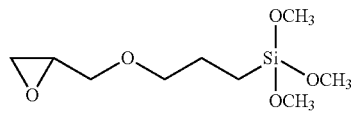

Glycidoxy propyltrimethoxy silane

In an additional embodiment, the adhesive can further comprises at least one of propylene carbonate, quinone dioxime, a phenolic resole resin, polyvinyl butyral, and/or the reaction product to produce a dipodal silane-amino and isocyanato silane RT reaction at 20% in cyclohexanone.

Adhesives of the embodiments described herein are typically provided in a solvent carrier fluid. The carrier fluid helps to disperse the active constituent materials and helps during application of the adhesive, i.e. sprayability, wettability, and the like. In one embodiment, water is provided as the carrier fluid. In another embodiment, a glycol-ether or glycol-based carrier fluid, such as propylene glycol is provided. Since the grafted resins of the present disclosure are typically not water soluble, some additional modification may be necessary to disperse the grafted rein in water.

Non-limiting examples of suitable solvents include hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol-ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methyl caprolactone, for example, but also solvents such as N-methylpyrrolidone and N-methylcaprolactam, 1,2-propylene carbonate, methylene chloride, dimethyl sulphoxide, triethyl phosphate or any mixtures of such solvents. In a preferred embodiment of the present disclosure, the solvent-based adhesive formulation comprises xylene, methylethyl ketone, cyclohexanone or mixtures thereof as the primary carrier.

In another preferred embodiment, the adhesive formulation is prepared to have about 30 to about 50 percent solids and about 50 to about 70 percent carrier fluid. In a most preferred embodiment, the adhesive comprises about 40 percent solids.

In one embodiment of the present disclosure, the adhesive is provided as a "one part" or 1K formulation, wherein all the constituent materials are provided in a single mixture. In another embodiment, particularly where components may react with each other, for example when a catalyst is used, the constituents are separated into two parts, i.e. 2K. In this embodiment, typically the catalyst is separated from all of the other components, other than a carrier solvent. However, depending upon the reactivity, it may be advantageous to have other constituents in the part containing the catalyst.

While not wishing to be bound by the theory, it is believed that the grafted phenoxy resin and uretdione of MDI work together to provide a crosslinked adhesive that chemisorbs to the metal surface, diffuses and entangles in the urethane elastomer, and provides crossbridging and crosslinking across the interface of the adhesive and the cast urethane. The covalent bonding achieved during the bonding cycle is sufficient to provide 100% rubber tearing bonds, or substantially 100% rubber tearing bonds, in tough high heat (e.g., 300° F., 149° C.) conditions. Surprisingly, this performance has yet to be achieved using prior art cast urethane adhesives.

More specifically, the carboxylic acid and hydroxyl group functionality on the phenoxy resin play multiple roles. First, they chemisorb to the metal substrate and provide functional bonding sites for crosslinking. In addition, the grafted moieties allow for diffusion and entanglement in the urethane polymer where they can be further crosslinked with uretdione from the adhesive or functional isocyanate groups on the castable urethane. The uretdione of MDI breaks apart at bonding temperatures (about 250-300° F., about 121-149° C.) providing two MDI molecules for crosslinking the grafted phenoxy resin and crossbridging into the urethane through reactions with the diamine curative.

In embodiments of the invention containing trimetholpropane, the TMP acts as a crosslinker which reacts with isocyanate to build crosslink density.

Similarly, in embodiments containing silanes, the silanes provide for additional crosslink density through both their functional groups (amino, epoxy, isocyanato, mercapto, etc.) and the alkoxy groups (after hydrolysis).

In some embodiments, the epoxy group can cure with amines from the castable urethane or the carboxylic acid groups on the polymer. In some embodiments, the mercapto group can cure with isocyanate functionality from the adhesive or the castable urethane. In some aspects, the amino group can cure with isocyanates, the isocyanate can cure with hydroxyls, amines, and carboxylic acids. After hydrolysis the alkoxy groups become 3 silanols that can co-condense with each other, or hydroxyl functionality, isocyanates, and can chemisorb to metal surfaces.

When present, the metal acetylacetonate can act as a catalyzer for the uretdione of MDI to increase crosslink density.

The adhesives described in the embodiments of the present disclosure provide a 1K system (that can be applied with multiple application methods) with unlimited pot-life (shelf life is at least 1 year) that is capable of achieving rubber tear and stock breaking bonds in castable urethanes with no prebake (just a dry cycle at 200° F. for 15 minutes) at the maximum temperature range called out by customers at about 300° F.

It is striking to see that the same combinations of components when using a base polymer like the non-grafted PKHH phenoxy cannot achieve these results in hot tear. It is noted that polyvinyl butyral due to a higher hydroxyl content performs much better than the base phenoxy resin PKHH. However, the grafted phenoxy resins, including for example phenoxy PKHS-27, clearly provides superior performance due to its ability to diffuse and form a higher crosslink density network. Yet if other components are removed it is apparent that PKHS-27 cannot achieve these results on its own accord. In one embodiment of the present invention, it is the combination of several different types of crosslinking chemistry coupled with the use of selected metal catalysts and other additives to achieve a stable 1K system with no prebake requirement that achieves 300° F. hot tear with 80-100% rubber retention and or stock breakage.

Thus, in some embodiments, provided herein are adhesives comprising a phenoxy resin grafted with MMA and/or methacrylic acid MA), and further comprising a uretdione or a silane. The silane can comprises any suitable silane composition, including for example at least one of an epoxy-, amino-, mercapto-, and/or isocyanato-silane. In some preferred embodiments, the silane can comprise glycidoxy propyltrimethoxy silane. Alternatively, or in addition, the uretdione can comprise a uretdione of methylene diphenyl diisocyanate (MDI).

The adhesives disclosed herein can in some aspects can further comprise a blocked hexamethylene diisocyanate (HDI), optionally wherein the HDI comprises diethylmalonate blocked biuret of HDI. The adhesives disclosed herein can in some aspects can further comprise a trimethylol propane.

In some aspects, such adhesive compositions do not contain a catalyst, and/or do not need or require a catalyst to be effect. Alternatively, in some aspects, the adhesives can optionally comprise a catalyst, preferably a metal acetylacetonate, wherein the metal acetylacetonate comprises at least one of zinc, aluminum, or zirconium acetylacetonate. Optionally, where present, the catalyst can comprise at least one of 2-ethylhexyl titanium acetylacetonate, titanium phosphate complex, or titanium acetylacetonate.

Importantly, the disclosed adhesive compositions can be completely or substantially absent free isocyanate, i.e. no free isocyanates are present. Additionally, in some aspects the adhesives can further comprise cyclohexanone as a carrier fluid.

Notably, in some aspects, in the disclosed adhesive compositions, the phenoxy resin grafted with MMA and/or MAA works with the uretdione or silane to form crosslinking. The adhesive can be configured to chemisorb to a metal surface, diffuse and entangle in a urethane elastomer and/or provide crossbridging and/or crosslinking across an interface of the adhesive and a cast urethane.

By way of example and not limitation, an adhesive of the presently disclosed subject matter can comprise an MMA/MAA grafted phenoxy resin, uretdione of MDI, and optionally trimethylolpropane, silane, and metal acetylacetonate in proportions of about 10:10:4:0:0, 10:10:4:1.4:0, or 10:10:0:0:1, respectively. Additionally, in some embodiments, an adhesive of the presently disclosed subject matter can comprise an MMA/MAA grafted phenoxy resin, silane and optionally HDI in proportions of about 80:1:0 or about 80:1:7, respectively.

As disclosed herein, such adhesives can be used to bond castable urethane to a substrate. The substrate can comprise a metallic substrate. Notably, such adhesives requires no prebake to achieve 100% rubber, or substantially 100%, retention and greater than 150 PLI after hot testing at 300° F. for a 2-hour soak pulled hot in the hot box (ASTM D429 Method B).

Correspondingly, methods of using the disclosed adhesives are also provided. For example, in some embodiments a method of adhering a castable urethane to a substrate can comprise providing an adhesive as disclosed herein, providing a substrate, and applying the adhesive and castable urethane to the substrate. Applying the adhesive can comprise spraying, brushing, dipping and/or rolling the adhesive on the substrate. In some preferred embodiments, the adhesive is sprayed onto the substrate, particularly at about 0.75 to about 1.1 mils dry film thickness (DFT) on a clean pre-heated metal substrate at about 150° F. to about 180° F. for about 15-20 minutes. In some embodiments, the substrate can comprise any suitable substrate to which castable urethanes are desired to be bonded, including for example any metallic substrate, such as for example a grit blasted steel (GBS) component. In some embodiments, such methods can further comprise an initial cure of about 260° F. for 30 minutes, and a post cure of about 16 hours at about 284° F. The castable urethane can be bonded to the substrate after application of the adhesive, optionally comprising hot molding followed by curing.

III. EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

In this example two MMA/MAA grafted phenoxy resin compositions were tested. The compositions of formulations 17007-40B and 17007-40F are provided below in Tables 1 and 2, respectively.

TABLE 1

17007-40B

| COMPONENT | % SOLIDS | AMOUNT |
|---|---|---|
| MMA/MAA Grafted phenoxy resin | 27% in MEK | 37.04 (10.0 g solid) |
| Uretdione of MDI | 100% | 10.0 g |
| Trimethylol propane | 100% | 4.0 g |
| Glycidoxy propyltrimethoxy silane | 100% | 1.4 g |
| Aluminum acetylacetonate | 100% | 1.0 g |
| Cyclohexanone | 0% | 46.56 |
| | TSC = 26.4% | Total = 100 |

TABLE 2

17007-40F

| COMPONENT | % SOLIDS | AMOUNT |
|---|---|---|
| MMA/MAA Grafted phenoxy resin | 27% IN MEK | 23.59 (6.37 g solid) |
| Uretdione of MDI | 100% | 12.74 g |
| Cyclohexanone | 0% | 63.67 g |
| | TSC = 19.11% | Total = 100 |

To make the formulations shown in Tables 1 and 2 solids were ground into carrier solvents and then added to the grafted resin with stirring. Any extra solvent was added at the end along with any silanes. Trimethylol propane is soluble in cyclohexanone and can be added at any time.

The disclosed adhesives were tested for their ability to effectively adhere a castable urethane to a substrate, including for example a metallic substrate. By way of example and not limitation, such a method can comprise a preparation step for first applying the adhesive to the substrate or part. One such preparation step tested is outlined as follows:

Part/Substrate Preparation/Application:
1. Spray apply adhesives (can be brushed, dipped or rolled as well): Mix adhesives until uniform before spraying at 0.75-1.1 mils dry film thickness (DFT) on clean pre-heated metal parts at about 150° F. to about 180° F. for about 15-20 minutes (a DFT of 1.0 mil can be optimal). Dry at 200° F. for about 15-20 minutes after spraying, the coated metal parts are now ready to bond.
2. Substrate: grit blasted steel (GBS) coupons (or other metal parts) 1 inch×1 inch square area, ASTM D429 Method B.
3. No prebake, initial cure=260° F. for 30 minutes, post cure=16 hours at 284° F. as described below.

After application of the adhesive to the substrate, a castable urethane can be bonded to the substrate or part using any suitable method, including for example the following method tested here.

Casting/Bonding Operation:
For casting the following steps and/or procedures were used: Bonding with an Index Number=95*
1. The prepolymer should be melted prior to using, using a 70° C. oven at 12-16 hours
2. The curative should be rolled at room temperature (RT) overnight
3. Add the curative to 70° C. (158° F.) prepolymer, mix thoroughly
4. Degas mixture in vacuum if necessary (27-29 inches of Hg)
5. Pour into a hot mold containing the adhesive coated part maintained at 127° C. (260° F.)
6. Cure for 30 minutes
7. Demold parts
8. Post cure at 140° C. (284° F.) 16 hours Testing:
1. ASTM D429 Method B
2. Primary at room temperature
3. 300° F. Hot Tear, 2 hour soak in Instron Hot Box tester, pulled hot in the box at 2" minute.

Figure 2:
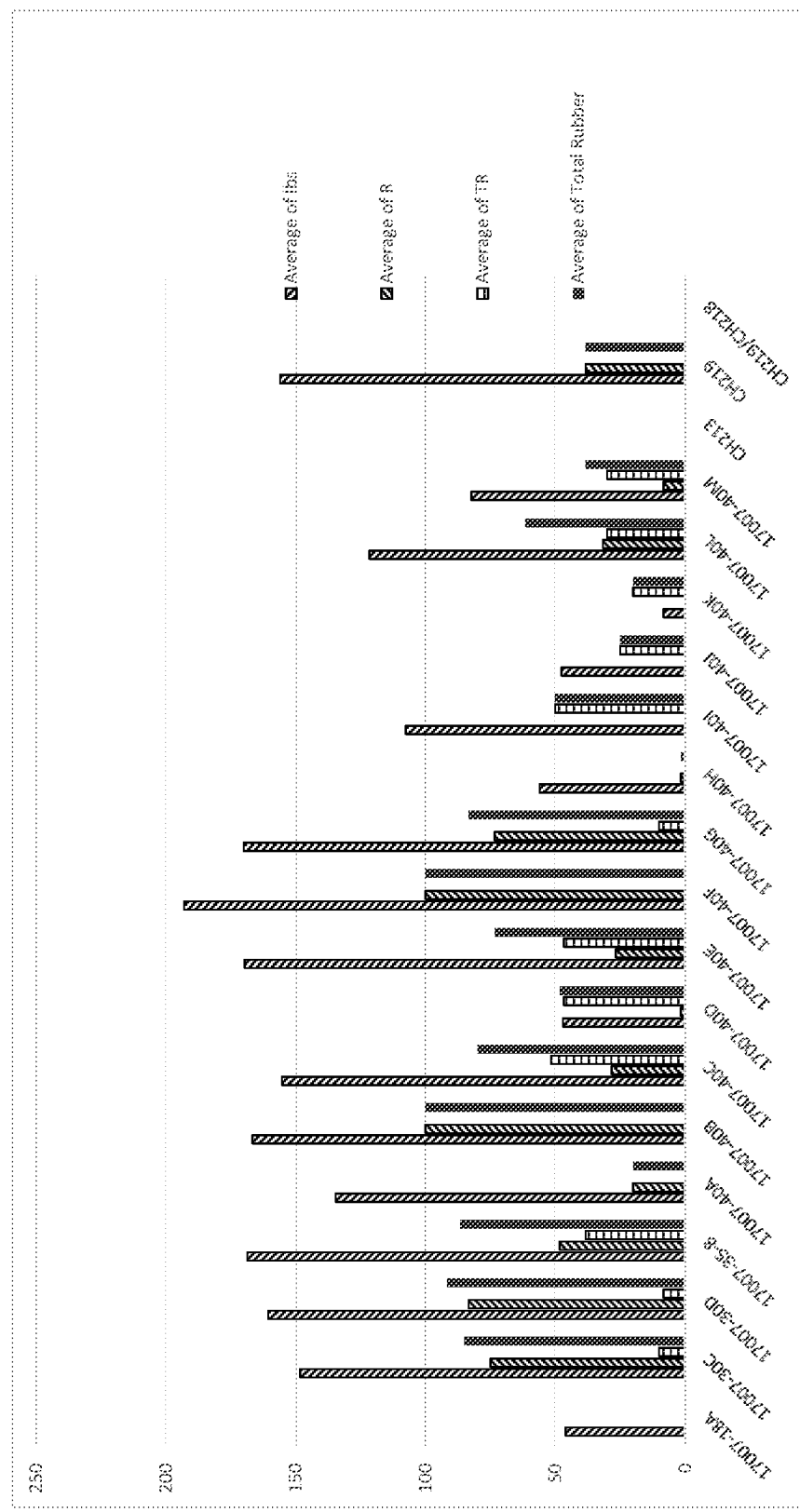

Results of the testing described above in Example 1 for formulations 17007-40B and 17007-40F are shown in FIGS. 1 and 2. Multiple iterations of the general formulas for 17007-40B and 40° F. show that the formulas outlined show considerable merit in both rubber retention and pounds pull. However, the formulas are robust enough that a range of iterations achieve good results in this test series.

Example 2

In this example, the aluminum acetylacetonate of Example 1 was replaced with one of three platinum-based catalysts in the formulation provided above. These modified formulations are summarized as follows:

47S=40F+2-ethylhexyl titanium acetylacetonate
47T=40F+Titanium phosphate complex
47U=40F+Titanium acetylacetonate The adhesive was then applied and tested as described above, with the results shown in Table 3.

TABLE 3

| Adhesive | Prebake | Environment | Peel Strength (lbs) | Total Rubber |
|---|---|---|---|---|
| 17007-47S | 0' | PRIMARY | 187 | 60 |
| 17007-47S | 0' | PRIMARY | 175 | 60 |
| 17007-47S | 0' | PRIMARY | 141 | 50 |
| 17007-47S | 0' | HEAT SOAK | 178 | 100 |
| 17007-47S | 0' | HEAT SOAK | 169 | 100 |
| 17007-47S | 0' | HEAT SOAK | 175 | 70 |
| 17007-47T | 0' | PRIMARY | 202 | 70 |
| 17007-47T | 0' | PRIMARY | 218 | 60 |
| 17007-47T | 0' | PRIMARY | 206 | 70 |
| 17007-47T | 0' | HEAT SOAK | 144 | 100 |
| 17007-47T | 0' | HEAT SOAK | 167 | 100 |
| 17007-47T | 0' | HEAT SOAK | 195 | 100 |
| 17007-47U | 0' | PRIMARY | 204 | 60 |
| 17007-47U | 0' | PRIMARY | 168 | 60 |
| 17007-47U | 0' | PRIMARY | 165 | 50 |
| 17007-47U | 0' | HEAT SOAK | 151 | 100 |
| 17007-47U | 0' | HEAT SOAK | 159 | 100 |
| 17007-47U | 0' | HEAT SOAK | 172 | 100 |

The data in Table 3 supports the fact that multiple catalysts of the type listed in Example 3 provide good Hot Tear retention and if not the ideal candidates, are suited as potential replacements for aluminum acetylacetonate in the main formula (Table 1=17007-40B).

Example 3

Additional formulations of castable urethane adhesives were developed and tested, including several based on Trixene BI 7963 which is a diethylmalonate blocked biuret of HDI (hexamethylene diisocyanate). The formulations are listed in Tables 4, 5 and 6.

TABLE 4

106-A Castable Adhesive based on Trixene BI 7963

| COMPONENT | SOLID WEIGHT | WET WEIGHT |
|---|---|---|
| PKHS-27 (grafted phenoxy, 27%) | 21.0 | 77.78 |
| A-187 Silane (epoxy) | 1.3 | 1.3 |
| Trixene BI 7963* | 10.0 | 14.28 |
| Cyclohexanone | 0 | 6.64 |
| Totals | 32.3% | 100.0 |

TABLE 5

106-B (Adhesive C) Castable Adhesive based on Trixene BI 7963

| COMPONENT | SOLID WEIGHT | WET WEIGHT |
|---|---|---|
| PKHS-27 (grafted phenoxy, 27%) | 21.0 | 77.78 |
| A-187 Silane (epoxy) | 1.3 | 1.3 |
| Trixene BI 7963* | 5.0 | 7.14 |
| Cyclohexanone | 0 | 13.78 |
| Totals | 27.3% | 100.0 |

TABLE 6

106-C Castable Adhesive based on Trixene BI 7963

| COMPONENT | SOLID WEIGHT % | WET WEIGHT % |
|---|---|---|
| PKHS-27 (grafted phenoxy, 27%) | 20.9 | 77.39 |
| A-187 Silane (epoxy) | 1.3 | 1.30 |
| Trixene BI 7963* | 14.92 | 21.31 |
| Cyclohexanone | 0 | 0 |
| Totals | 32.3% | 100.0% |

*Trixene BI 7963 is a diethylmalonate blocked biuret of HDI (hexamethylene diisocyanate) see below, provided at 70% TSC in Dowanol PM. Also shown in Structure 5 below.

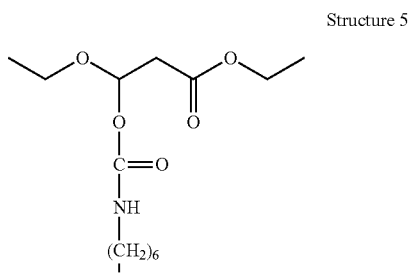

Structure 5

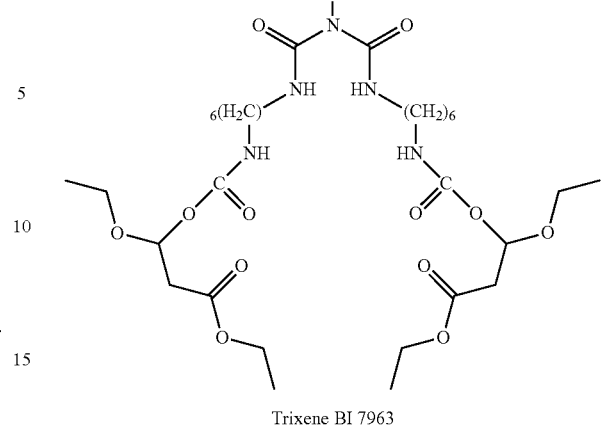

Trixene BI 7963

Example 4

Additional formulations of castable urethane adhesives were developed and tested. The formulations are listed in Tables 7, 8 and 9.

TABLE 7

88H (Adhesive A) New Castable Adhesive simplified (1K version)

| COMPONENT | SOLID WEIGHT | WET WEIGHT |
|---|---|---|
| PKHS-27 (grafted phenoxy, 27%) | 21.0 | 77.78 |
| A-187 Silane (epoxy) | 1.3 | 1.30 |
| Cyclohexanone | 0 | 20.92 |
| Totals | 22.3% | 100.0 |

TABLE 8

88H (Adhesive A) New Castable Adhesive simplified (2K version) A-side

| COMPONENT | SOLID WEIGHT | WET WEIGHT |
|---|---|---|
| PKHS-27 (grafted phenoxy, 27%) | 21.0 | 77.78 |
| A-187 Silane (epoxy) | 1.3 | 1.30 |
| Cyclohexanone | 0 | 20.92 |
| Totals | 22.3% | 100.0 |

TABLE 9

88H (Adhesive B) New Castable Adhesive simplified (2K version) B-side

| COMPONENT | SOLID WEIGHT | WET WEIGHT |
|---|---|---|
| Mondur MR (polymeric/MDI) * | 10.0 | 10.0 |
| Totals | 100% | 100.0 |

In some embodiments, the mix ratio for the formulations of Tables 8 and 9 can be about 10 parts of A side (Table 8) to about 1 part of the B side (Table 9).

In some embodiments, Mondur MR (polymeric/MDI), included in the B side of Formula 88H, can have a structure as shown below in Structure 6.

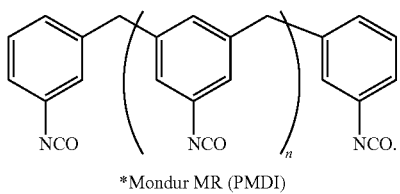

Structure 6

*Mondur MR (PMDI)

The formulations discussed in Examples 3 and 4 were tested for effectiveness in bonding castable urethanes, the results of which are shown in Table 10, below. Current market trends for castable urethane applications are moving into areas that require high temperature performance and hot/wet environments for certain cyclic operations where a period of intense heat build-up (with or without moisture) is followed by a cool down period in between operations. The adhesives listed in Examples 3 and 4, with test results shown in Table 10, were specifically designed to fill this technological gap in the market. The adhesive examples listed allow for successful bonding at elevated temperatures from room temperature up to 171° C., with and without moisture present. The data shows that this combination of adhesives allows for coverage of both mainstream castable urethane grades with different durometers and curatives and niche urethane applications as well. When the correct adhesive is paired with the corresponding urethane elastomer for the test application, then the results show high rubber retention and excellent pull values consistent with industry standards.

TABLE 10

| Urethane System | Adhesive | Prebake | Environment | Peak Peel Strength (N/mm) | Total Rubber |
|---|---|---|---|---|---|
| 1-A95E | Adhesive A | NO PREBAKE | PRIMARY | 63.06 | 100 |
| 1-A95E | Adhesive A | NO PREBAKE | PRIMARY | 58.17 | 100 |
| 1-A95E | Adhesive A | NO PREBAKE | PRIMARY | 57.23 | 100 |
| 1-A95E | Adhesive A | NO PREBAKE | 2-HR 93° C. HOT BOX | 42.61 | 100 |
| 1-A95E | Adhesive A | NO PREBAKE | 2-HR 93° C. HOT BOX | 36.35 | 100 |
| 1-A95E | Adhesive A | NO PREBAKE | 2-HR 93° C. HOT BOX | 38.19 | 95 |
| 1-A95E | Adhesive A | NO PREBAKE | 2-HR 121° C. HOT BOX | 21.35 | 80 |
| 1-A95E | Adhesive A | NO PREBAKE | 2-HR 121° C. HOT BOX | 23.73 | 80 |
| 1-A95E | Adhesive A | NO PREBAKE | 2-HR 121° C. HOT BOX | 35.81 | 90 |
| 1-A95E | Adhesive A | NO PREBAKE | 24-HR UNSTRESSED BOILING WATER | 50.22 | 70 |
| 1-A95E | Adhesive A | NO PREBAKE | 24-HR UNSTRESSED BOILING WATER | 54.27 | 65 |
| 1-A95E | Adhesive A | NO PREBAKE | 24-HR UNSTRESSED BOILING WATER | 53.32 | 95 |
| 1-A95E | Adhesive A | NO PREBAKE | 72-HR UNSTRESSED 80° C. WATER SOAK | 34.74 | 15 |
| 1-A95E | Adhesive A | NO PREBAKE | 72-HR UNSTRESSED 80° C. WATER SOAK | 23.19 | 25 |
| 1-A95E | Adhesive A | NO PREBAKE | 72-HR UNSTRESSED 80° C. WATER SOAK | 48.53 | 5 |
| 1-A95E | Adhesive A | NO PREBAKE | 7-DAY 85° C./85% RH | 55.92 | 80 |
| 1-A95E | Adhesive A | NO PREBAKE | 7-DAY 85° C./85% RH | 52.62 | 100 |
| 1-A95E | Adhesive A | NO PREBAKE | 7-DAY 85° C./85% RH | 60.12 | 80 |
| 3-A95ES | Adhesive A | NO PREBAKE | PRIMARY | 97.77 | 100 |
| 3-A95ES | Adhesive A | NO PREBAKE | PRIMARY | 90.52 | 100 |
| 3-A95ES | Adhesive A | NO PREBAKE | PRIMARY | 77.89 | 100 |
| 3-A95ES | Adhesive A | NO PREBAKE | 2-HR 93° C. HOT BOX | 36.53 | 100 |
| 3-A95ES | Adhesive A | NO PREBAKE | 2-HR 93° C. HOT BOX | 48.26 | 100 |
| 3-A95ES | Adhesive A | NO PREBAKE | 2-HR 93° C. HOT BOX | 42.68 | 100 |
| 3-A95ES | Adhesive A | NO PREBAKE | 2-HR 121° C. HOT BOX | 28.49 | 55 |
| 3-A95ES | Adhesive A | NO PREBAKE | 2-HR 121° C. HOT BOX | 49.09 | 97 |
| 3-A95ES | Adhesive A | NO PREBAKE | 2-HR 121° C. HOT BOX | 44.18 | 95 |
| 3-A95ES | Adhesive A | NO PREBAKE | 72-HR UNSTRESSED 80° C. WATER SOAK | 37.88 | 30 |
| 3-A95ES | Adhesive A | NO PREBAKE | 72-HR UNSTRESSED 80° C. WATER SOAK | 47.42 | 25 |
| 3-A95ES | Adhesive A | NO PREBAKE | 7-DAY 85° C./85% RH | 62.62 | 100 |
| 3-A95ES | Adhesive A | NO PREBAKE | 7-DAY 85° C./85% RH | 48.17 | 100 |
| 3-A95ES | Adhesive A | NO PREBAKE | 7-DAY 85° C./85% RH | 58.45 | 100 |
| 2-A85E | Adhesive A | NO PREBAKE | PRIMARY | 16.02 | 100 |
| 2-A85E | Adhesive A | NO PREBAKE | PRIMARY | 38.12 | 100 |
| 2-A85E | Adhesive A | NO PREBAKE | PRIMARY | 26.39 | 100 |
| 2-A85E | Adhesive A | NO PREBAKE | 2-HR 93° C. HOT BOX | 15.64 | 97 |
| 2-A85E | Adhesive A | NO PREBAKE | 2-HR 93° C. HOT BOX | 10.47 | 100 |
| 2-A85E | Adhesive A | NO PREBAKE | 2-HR 121° C. HOT BOX | 8.83 | 100 |
| 2-A85E | Adhesive A | NO PREBAKE | 2-HR 121° C. HOT BOX | 8.84 | 95 |
| 2-A85E | Adhesive A | NO PREBAKE | 24-HR UNSTRESSED BOILING WATER | 32.03 | 90 |
| 2-A85E | Adhesive A | NO PREBAKE | 24-HR UNSTRESSED BOILING WATER | 8.14 | 100 |
| 2-A85E | Adhesive A | NO PREBAKE | 24-HR UNSTRESSED BOILING WATER | 27.58 | 95 |
| 2-A85E | Adhesive A | NO PREBAKE | 72-HR UNSTRESSED 80° C. WATER SOAK | 22.75 | 60 |

TABLE 10-continued

| Urethane System | Adhesive | Prebake | Environment | Peak Peel Strength (N/mm) | Total Rubber |
|---|---|---|---|---|---|
| 2-A85E | Adhesive A | NO PREBAKE | 72-HR UNSTRESSED 80° C. WATER SOAK | 22.66 | 65 |
| 2-A85E | Adhesive A | NO PREBAKE | 7-DAY 85° C./85% RH | 33.27 | 100 |
| 2-A85E | Adhesive A | NO PREBAKE | 7-DAY 85° C./85% RH | 31.70 | 100 |
| 2-A85E | Adhesive A | NO PREBAKE | 7-DAY 85° C./85% RH | 24.60 | 100 |
| 4-A85ES | Adhesive A | NO PREBAKE | PRIMARY | 54.11 | 98 |
| 4-A85ES | Adhesive A | NO PREBAKE | PRIMARY | 46.04 | 100 |
| 4-A85ES | Adhesive A | NO PREBAKE | PRIMARY | 39.33 | 100 |
| 4-A85ES | Adhesive A | NO PREBAKE | 2-HR 93° C. HOT BOX | 21.33 | 100 |
| 4-A85ES | Adhesive A | NO PREBAKE | 2-HR 93° C. HOT BOX | 24.74 | 100 |
| 4-A85ES | Adhesive A | NO PREBAKE | 2-HR 93° C. HOT BOX | 32.82 | 100 |
| 4-A85ES | Adhesive A | NO PREBAKE | 2-HR 121° C. HOT BOX | 19.39 | 95 |
| 4-A85ES | Adhesive A | NO PREBAKE | 2-HR 121° C. HOT BOX | 18.90 | 98 |
| 4-A85ES | Adhesive A | NO PREBAKE | 2-HR 121° C. HOT BOX | 17.16 | 95 |
| 4-A85ES | Adhesive A | NO PREBAKE | 72-HR UNSTRESSED 80° C. WATER SOAK | 30.56 | 90 |
| 4-A85ES | Adhesive A | NO PREBAKE | 72-HR UNSTRESSED 80° C. WATER SOAK | 26.41 | 100 |
| 4-A85ES | Adhesive A | NO PREBAKE | 72-HR UNSTRESSED 80° C. WATER SOAK | 26.37 | 100 |
| 4-A85ES | Adhesive A | NO PREBAKE | 7-DAY 85° C./85% RH | 16.67 | 100 |
| 4-A85ES | Adhesive A | NO PREBAKE | 7-DAY 85° C./85% RH | 20.51 | 100 |
| 4-A85ES | Adhesive A | NO PREBAKE | 7-DAY 85° C./85% RH | 20.49 | 100 |
| 5-A85ES | Adhesive A | NO PREBAKE | PRIMARY | 61.89 | 100 |
| 5-A85ES | Adhesive A | NO PREBAKE | PRIMARY | 61.92 | 100 |
| 5-A85ES | Adhesive A | NO PREBAKE | PRIMARY | 63.04 | 100 |
| 5-A85ES | Adhesive A | NO PREBAKE | 2-HR 93° C. HOT BOX | 60.68 | 100 |
| 5-A85ES | Adhesive A | NO PREBAKE | 2-HR 93° C. HOT BOX | 22.89 | 100 |
| 5-A85ES | Adhesive A | NO PREBAKE | 2-HR 93° C. HOT BOX | 17.58 | 95 |
| 5-A85ES | Adhesive A | NO PREBAKE | 2-HR 121° C. HOT BOX | 26.62 | 100 |
| 5-A85ES | Adhesive A | NO PREBAKE | 2-HR 121° C. HOT BOX | 17.74 | 100 |
| 5-A85ES | Adhesive A | NO PREBAKE | 2-HR 121° C. HOT BOX | 15.01 | 100 |
| 5-A85ES | Adhesive A | NO PREBAKE | 72-HR UNSTRESSED 80° C. WATER SOAK | 30.75 | 35 |
| 5-A85ES | Adhesive A | NO PREBAKE | 72-HR UNSTRESSED 80° C. WATER SOAK | 29.59 | 45 |
| 5-A85ES | Adhesive A | NO PREBAKE | 72-HR UNSTRESSED 80° C. WATER SOAK | 28.46 | 50 |
| 5-A85ES | Adhesive A | NO PREBAKE | 7-DAY 85° C./85% RH | 33.87 | 100 |
| 5-A85ES | Adhesive A | NO PREBAKE | 7-DAY 85° C./85% RH | 33.80 | 90 |
| 5-A85ES | Adhesive A | NO PREBAKE | 7-DAY 85° C./85% RH | 41.75 | 90 |
| 6-A85E | Adhesive A | NO PREBAKE | PRIMARY | 35.83 | 100 |
| 6-A85E | Adhesive A | NO PREBAKE | PRIMARY | 44.11 | 100 |
| 6-A85E | Adhesive A | NO PREBAKE | PRIMARY | 28.93 | 100 |
| 6-A85E | Adhesive A | NO PREBAKE | 2-HR 93° C. HOT BOX | 7.39 | 100 |
| 6-A85E | Adhesive A | NO PREBAKE | 2-HR 93° C. HOT BOX | 10.21 | 100 |
| 6-A85E | Adhesive A | NO PREBAKE | 2-HR 121° C. HOT BOX | 15.67 | 100 |
| 6-A85E | Adhesive A | NO PREBAKE | 2-HR 121° C. HOT BOX | 5.01 | 100 |
| 6-A85E | Adhesive A | NO PREBAKE | 24-HR UNSTRESSED BOILING WATER | 36.97 | 85 |
| 6-A85E | Adhesive A | NO PREBAKE | 24-HR UNSTRESSED BOILING WATER | 27.84 | 90 |
| 6-A85E | Adhesive A | NO PREBAKE | 24-HR UNSTRESSED BOILING WATER | 40.56 | 100 |
| 6-A85E | Adhesive A | NO PREBAKE | 72-HR UNSTRESSED 80° C. WATER SOAK | 24.41 | 100 |
| 6-A85E | Adhesive A | NO PREBAKE | 72-HR UNSTRESSED 80° C. WATER SOAK | 35.01 | 85 |
| 6-A85E | Adhesive A | NO PREBAKE | 72-HR UNSTRESSED 80° C. WATER SOAK | 19.18 | 90 |
| 6-A85E | Adhesive A | NO PREBAKE | 7-DAY 85° C./85% RH | 31.33 | 100 |
| 6-A85E | Adhesive A | NO PREBAKE | 7-DAY 85° C./85% RH | 38.19 | 97 |
| 6-A85E | Adhesive A | NO PREBAKE | 7-DAY 85° C./85% RH | 36.58 | 100 |
| 1-A95E | Adhesive A | 2-HR PREBAKE | PRIMARY | 53.10 | 100 |
| 1-A95E | Adhesive A | 2-HR PREBAKE | PRIMARY | 59.59 | 100 |
| 1-A95E | Adhesive A | 2-HR PREBAKE | PRIMARY | 58.89 | 100 |
| 1-A95E | Adhesive A | 2-HR PREBAKE | 2-HR 93° C. HOT BOX | 37.07 | 100 |
| 1-A95E | Adhesive A | 2-HR PREBAKE | 2-HR 93° C. HOT BOX | 41.38 | 100 |
| 1-A95E | Adhesive A | 2-HR PREBAKE | 2-HR 93° C. HOT BOX | 32.47 | 100 |
| 1-A95E | Adhesive A | 2-HR PREBAKE | 2-HR 121° C. HOT BOX | 28.37 | 100 |
| 1-A95E | Adhesive A | 2-HR PREBAKE | 2-HR 121° C. HOT BOX | 11.58 | 5 |
| 1-A95E | Adhesive A | 2-HR PREBAKE | 2-HR 121° C. HOT BOX | 21.82 | 95 |
| 1-A95E | Adhesive A | 2-HR PREBAKE | 24-HR UNSTRESSED BOILING WATER | 39.96 | 30 |
| 1-A95E | Adhesive A | 2-HR PREBAKE | 24-HR UNSTRESSED BOILING WATER | 19.23 | 10 |

TABLE 10-continued

| Urethane System | Adhesive | Prebake | Environment | Peak Peel Strength (N/mm) | Total Rubber |
|---|---|---|---|---|---|
| 1-A95E | Adhesive A | 2-HR PREBAKE | 24-HR UNSTRESSED BOILING WATER | 12.40 | 3 |
| 1-A95E | Adhesive A | 2-HR PREBAKE | 72-HR UNSTRESSED 80° C. WATER SOAK | 15.32 | 5 |
| 1-A95E | Adhesive A | 2-HR PREBAKE | 72-HR UNSTRESSED 80° C. WATER SOAK | 18.12 | 10 |
| 1-A95E | Adhesive A | 2-HR PREBAKE | 72-HR UNSTRESSED 80° C. WATER SOAK | 37.28 | 15 |
| 1-A95E | Adhesive A | 2-HR PREBAKE | 7-DAY 85° C./85% RH | 44.39 | 100 |
| 1-A95E | Adhesive A | 2-HR PREBAKE | 7-DAY 85° C./85% RH | 48.60 | 95 |
| 1-A95E | Adhesive A | 2-HR PREBAKE | 7-DAY 85° C./85% RH | 50.24 | 85 |
| 3-A95ES | Adhesive A | 2-HR PREBAKE | PRIMARY | 96.49 | 100 |
| 3-A95ES | Adhesive A | 2-HR PREBAKE | PRIMARY | 100.55 | 100 |
| 3-A95ES | Adhesive A | 2-HR PREBAKE | PRIMARY | 94.77 | 100 |
| 3-A95ES | Adhesive A | 2-HR PREBAKE | 2-HR 93° C. HOT BOX | 61.12 | 100 |
| 3-A95ES | Adhesive A | 2-HR PREBAKE | 2-HR 93° C. HOT BOX | 61.05 | 100 |
| 3-A95ES | Adhesive A | 2-HR PREBAKE | 2-HR 93° C. HOT BOX | 60.24 | 100 |
| 3-A95ES | Adhesive A | 2-HR PREBAKE | 2-HR 121° C. HOT BOX | 44.43 | 90 |
| 3-A95ES | Adhesive A | 2-HR PREBAKE | 2-HR 121° C. HOT BOX | 49.19 | 100 |
| 3-A95ES | Adhesive A | 2-HR PREBAKE | 2-HR 121° C. HOT BOX | 21.75 | 15 |
| 3-A95ES | Adhesive A | 2-HR PREBAKE | 72-HR UNSTRESSED 80° C. WATER SOAK | 24.08 | 15 |
| 3-A95ES | Adhesive A | 2-HR PREBAKE | 72-HR UNSTRESSED 80° C. WATER SOAK | 35.30 | 15 |
| 3-A95ES | Adhesive A | 2-HR PREBAKE | 72-HR UNSTRESSED 80° C. WATER SOAK | 33.68 | 20 |
| 3-A95ES | Adhesive A | 2-HR PREBAKE | 7-DAY 85° C./85% RH | 63.43 | 25 |
| 3-A95ES | Adhesive A | 2-HR PREBAKE | 7-DAY 85° C./85% RH | 60.21 | 90 |
| 3-A95ES | Adhesive A | 2-HR PREBAKE | 7-DAY 85° C./85% RH | 64.51 | 95 |
| 2-A85E | Adhesive A | 2-HR PREBAKE | PRIMARY | 34.25 | 100 |
| 2-A85E | Adhesive A | 2-HR PREBAKE | PRIMARY | 26.06 | 100 |
| 2-A85E | Adhesive A | 2-HR PREBAKE | PRIMARY | 37.63 | 100 |
| 2-A85E | Adhesive A | 2-HR PREBAKE | 2-HR 93° C. HOT BOX | 12.15 | 100 |
| 2-A85E | Adhesive A | 2-HR PREBAKE | 2-HR 93° C. HOT BOX | 13.71 | 100 |
| 2-A85E | Adhesive A | 2-HR PREBAKE | 2-HR 121° C. HOT BOX | 4.03 | 100 |
| 2-A85E | Adhesive A | 2-HR PREBAKE | 2-HR 121° C. HOT BOX | 10.12 | 100 |
| 2-A85E | Adhesive A | 2-HR PREBAKE | 24-HR UNSTRESSED BOILING WATER | 26.86 | 45 |
| 2-A85E | Adhesive A | 2-HR PREBAKE | 24-HR UNSTRESSED BOILING WATER | 29.77 | 90 |
| 2-A85E | Adhesive A | 2-HR PREBAKE | 24-HR UNSTRESSED BOILING WATER | 31.33 | 85 |
| 2-A85E | Adhesive A | 2-HR PREBAKE | 72-HR UNSTRESSED 80° C. WATER SOAK | 17.13 | 100 |
| 2-A85E | Adhesive A | 2-HR PREBAKE | 72-HR UNSTRESSED 80° C. WATER SOAK | 4.73 | 100 |
| 2-A85E | Adhesive A | 2-HR PREBAKE | 72-HR UNSTRESSED 80° C. WATER SOAK | 24.64 | 65 |
| 2-A85E | Adhesive A | 2-HR PREBAKE | 7-DAY 85° C./85% RH | 34.92 | 100 |
| 2-A85E | Adhesive A | 2-HR PREBAKE | 7-DAY 85° C./85% RH | 13.26 | 100 |
| 2-A85E | Adhesive A | 2-HR PREBAKE | 7-DAY 85° C./85% RH | 35.29 | 100 |
| 4-A85ES | Adhesive A | 2-HR PREBAKE | PRIMARY | 43.46 | 100 |
| 4-A85ES | Adhesive A | 2-HR PREBAKE | PRIMARY | 38.44 | 100 |
| 4-A85ES | Adhesive A | 2-HR PREBAKE | PRIMARY | 56.53 | 100 |
| 4-A85ES | Adhesive A | 2-HR PREBAKE | 2-HR 93° C. HOT BOX | 37.34 | 100 |
| 4-A85ES | Adhesive A | 2-HR PREBAKE | 2-HR 93° C. HOT BOX | 30.75 | 100 |
| 4-A85ES | Adhesive A | 2-HR PREBAKE | 2-HR 93° C. HOT BOX | 31.21 | 100 |
| 4-A85ES | Adhesive A | 2-HR PREBAKE | 2-HR 121° C. HOT BOX | 22.31 | 100 |
| 4-A85ES | Adhesive A | 2-HR PREBAKE | 2-HR 121° C. HOT BOX | 27.09 | 100 |
| 4-A85ES | Adhesive A | 2-HR PREBAKE | 2-HR 121° C. HOT BOX | 28.79 | 100 |
| 4-A85ES | Adhesive A | 2-HR PREBAKE | 72-HR UNSTRESSED 80° C. WATER SOAK | 30.91 | 20 |
| 4-A85ES | Adhesive A | 2-HR PREBAKE | 72-HR UNSTRESSED 80° C. WATER SOAK | 34.34 | 60 |
| 4-A85ES | Adhesive A | 2-HR PREBAKE | 72-HR UNSTRESSED 80° C. WATER SOAK | 35.30 | 95 |
| 4-A85ES | Adhesive A | 2-HR PREBAKE | 7-DAY 85° C./85% RH | 21.24 | 100 |
| 4-A85ES | Adhesive A | 2-HR PREBAKE | 7-DAY 85° C./85% RH | 23.08 | 100 |
| 4-A85ES | Adhesive A | 2-HR PREBAKE | 7-DAY 85° C./85% RH | 21.80 | 100 |
| 5-A85ES | Adhesive A | 2-HR PREBAKE | PRIMARY | 61.03 | 100 |
| 5-A85ES | Adhesive A | 2-HR PREBAKE | PRIMARY | 51.94 | 80 |
| 5-A85ES | Adhesive A | 2-HR PREBAKE | PRIMARY | 42.10 | 40 |
| 5-A85ES | Adhesive A | 2-HR PREBAKE | 2-HR 93° C. HOT BOX | 30.23 | 100 |
| 5-A85ES | Adhesive A | 2-HR PREBAKE | 2-HR 93° C. HOT BOX | 28.09 | 100 |
| 5-A85ES | Adhesive A | 2-HR PREBAKE | 2-HR 93° C. HOT BOX | 2.08 | 100 |
| 5-A85ES | Adhesive A | 2-HR PREBAKE | 2-HR 121° C. HOT BOX | 7.60 | 100 |

TABLE 10-continued

| Urethane System | Adhesive | Prebake | Environment | Peak Peel Strength (N/mm) | Total Rubber |
|---|---|---|---|---|---|
| 5-A85ES | Adhesive A | 2-HR PREBAKE | 2-HR 121° C. HOT BOX | 16.43 | 100 |
| 5-A85ES | Adhesive A | 2-HR PREBAKE | 2-HR 121° C. HOT BOX | 16.01 | 100 |
| 5-A85ES | Adhesive A | 2-HR PREBAKE | 72-HR UNSTRESSED 80° C. WATER SOAK | 30.65 | 40 |
| 5-A85ES | Adhesive A | 2-HR PREBAKE | 72-HR UNSTRESSED 80° C. WATER SOAK | 29.37 | 45 |
| 5-A85ES | Adhesive A | 2-HR PREBAKE | 72-HR UNSTRESSED 80° C. WATER SOAK | 22.56 | 20 |
| 5-A85ES | Adhesive A | 2-HR PREBAKE | 7-DAY 85° C./85% RH | 46.13 | 100 |
| 5-A85ES | Adhesive A | 2-HR PREBAKE | 7-DAY 85° C./85% RH | 47.72 | 100 |
| 5-A85ES | Adhesive A | 2-HR PREBAKE | 7-DAY 85° C./85% RH | 41.70 | 98 |
| 6-A85E | Adhesive A | 2-HR PREBAKE | PRIMARY | 29.68 | 100 |
| 6-A85E | Adhesive A | 2-HR PREBAKE | PRIMARY | 38.98 | 100 |
| 6-A85E | Adhesive A | 2-HR PREBAKE | PRIMARY | 41.26 | 100 |
| 6-A85E | Adhesive A | 2-HR PREBAKE | 2-HR 93° C. HOT BOX | 20.17 | 90 |
| 6-A85E | Adhesive A | 2-HR PREBAKE | 2-HR 93° C. HOT BOX | 20.03 | 100 |
| 6-A85E | Adhesive A | 2-HR PREBAKE | 2-HR 93° C. HOT BOX | 31.19 | 90 |
| 6-A85E | Adhesive A | 2-HR PREBAKE | 2-HR 121° C. HOT BOX | 17.93 | 90 |
| 6-A85E | Adhesive A | 2-HR PREBAKE | 2-HR 121° C. HOT BOX | 18.16 | 100 |
| 6-A85E | Adhesive A | 2-HR PREBAKE | 2-HR 121° C. HOT BOX | 18.58 | 100 |
| 6-A85E | Adhesive A | 2-HR PREBAKE | 24-HR UNSTRESSED BOILING WATER | 31.50 | 0 |
| 6-A85E | Adhesive A | 2-HR PREBAKE | 24-HR UNSTRESSED BOILING WATER | 24.34 | 10 |
| 6-A85E | Adhesive A | 2-HR PREBAKE | 24-HR UNSTRESSED BOILING WATER | 30.82 | 75 |
| 6-A85E | Adhesive A | 2-HR PREBAKE | 72-HR UNSTRESSED 80° C. WATER SOAK | 37.77 | 75 |
| 6-A85E | Adhesive A | 2-HR PREBAKE | 72-HR UNSTRESSED 80° C. WATER SOAK | 31.59 | 75 |
| 6-A85E | Adhesive A | 2-HR PREBAKE | 72-HR UNSTRESSED 80° C. WATER SOAK | 32.20 | 90 |
| 6-A85E | Adhesive A | 2-HR PREBAKE | 7-DAY 85° C./85% RH | 33.89 | 75 |
| 6-A85E | Adhesive A | 2-HR PREBAKE | 7-DAY 85° C./85% RH | 37.18 | 87 |
| 6-A85E | Adhesive A | 2-HR PREBAKE | 7-DAY 85° C./85% RH | 28.86 | 15 |
| 7-A90E | Adhesive A | NO PREBAKE | PRIMARY | 53.52 | 100 |
| 7-A90E | Adhesive A | NO PREBAKE | PRIMARY | 48.51 | 97 |
| 7-A90E | Adhesive A | NO PREBAKE | PRIMARY | 55.64 | 100 |
| 7-A90E | Adhesive A | NO PREBAKE | 8-HR 171° C. HOT TREE | 29.45 | 100 |
| 7-A90E | Adhesive A | NO PREBAKE | 8-HR 171° C. HOT TREE | 31.19 | 100 |
| 7-A90E | Adhesive A | NO PREBAKE | 8-HR 171° C. HOT TREE | 40.15 | 100 |
| 7-A90E | Adhesive A | NO PREBAKE | PRIMARY | 57.74 | 100 |
| 7-A90E | Adhesive A | NO PREBAKE | PRIMARY | 57.98 | 95 |
| 7-A90E | Adhesive A | NO PREBAKE | PRIMARY | 56.00 | 100 |
| 7-A90E | Adhesive A | NO PREBAKE | 8-HR 171° C. HOT TREE | 0.00 | 0 |
| 7-A90E | Adhesive A | NO PREBAKE | 8-HR 171° C. HOT TREE | 45.16 | 50 |
| 7-A90E | Adhesive A | NO PREBAKE | 8-HR 171° C. HOT TREE | 0.00 | 0 |
| 8-A90C | Adhesive A | NO PREBAKE | PRIMARY | 53.03 | 90 |
| 8-A90C | Adhesive A | NO PREBAKE | PRIMARY | 61.08 | 90 |
| 8-A90C | Adhesive A | NO PREBAKE | PRIMARY | 54.69 | 90 |
| 8-A90C | Adhesive A | NO PREBAKE | 2-HR 149° C. HOT BOX | 10.91 | 5 |
| 8-A90C | Adhesive A | NO PREBAKE | 2-HR 149° C. HOT BOX | 5.50 | 5 |
| 8-A90C | Adhesive A | NO PREBAKE | 2-HR 149° C. HOT BOX | 5.36 | 5 |
| 1-A95E | Adhesive A + B | NO PREBAKE | PRIMARY | 60.57 | 100 |
| 1-A95E | Adhesive A + B | NO PREBAKE | PRIMARY | 56.25 | 100 |
| 1-A95E | Adhesive A + B | NO PREBAKE | PRIMARY | 64.93 | 100 |
| 1-A95E | Adhesive A + B | NO PREBAKE | 2-HR 93° C. HOT BOX | 32.96 | 98 |
| 1-A95E | Adhesive A + B | NO PREBAKE | 2-HR 93° C. HOT BOX | 38.67 | 100 |
| 1-A95E | Adhesive A + B | NO PREBAKE | 2-HR 93° C. HOT BOX | 46.20 | 95 |
| 1-A95E | Adhesive A + B | NO PREBAKE | 2-HR 121° C. HOT BOX | 32.38 | 100 |
| 1-A95E | Adhesive A + B | NO PREBAKE | 2-HR 121° C. HOT BOX | 35.60 | 100 |
| 1-A95E | Adhesive A + B | NO PREBAKE | 2-HR 121° C. HOT BOX | 12.66 | 100 |
| 1-A95E | Adhesive A + B | NO PREBAKE | 24-HR UNSTRESSED BOILING WATER | 51.17 | 95 |
| 1-A95E | Adhesive A + B | NO PREBAKE | 24-HR UNSTRESSED BOILING WATER | 34.31 | 90 |
| 1-A95E | Adhesive A + B | NO PREBAKE | 24-HR UNSTRESSED BOILING WATER | 33.76 | 70 |
| 1-A95E | Adhesive A + B | NO PREBAKE | 72-HR UNSTRESSED 80° C. WATER SOAK | 27.84 | 25 |
| 1-A95E | Adhesive A + B | NO PREBAKE | 72-HR UNSTRESSED 80° C. WATER SOAK | 36.21 | 40 |

TABLE 10-continued

| Urethane System | Adhesive | Prebake | Environment | Peak Peel Strength (N/mm) | Total Rubber |
|---|---|---|---|---|---|
| 1-A95E | Adhesive A + B | NO PREBAKE | 72-HR UNSTRESSED 80° C. WATER SOAK | 32.83 | 40 |
| 1-A95E | Adhesive A + B | NO PREBAKE | 7-DAY 85° C./85% RH | 58.38 | 100 |
| 1-A95E | Adhesive A + B | NO PREBAKE | 7-DAY 85° C./85% RH | 44.69 | 90 |
| 1-A95E | Adhesive A + B | NO PREBAKE | 7-DAY 85° C./85% RH | 48.98 | 100 |
| 3-A95ES | Adhesive A + B | NO PREBAKE | PRIMARY | 72.85 | 100 |
| 3-A95ES | Adhesive A + B | NO PREBAKE | PRIMARY | 66.70 | 100 |
| 3-A95ES | Adhesive A + B | NO PREBAKE | PRIMARY | 71.01 | 95 |
| 3-A95ES | Adhesive A + B | NO PREBAKE | 2-HR 93° C. HOT BOX | 59.98 | 98 |
| 3-A95ES | Adhesive A + B | NO PREBAKE | 2-HR 93° C. HOT BOX | 59.72 | 97 |
| 3-A95ES | Adhesive A + B | NO PREBAKE | 2-HR 121° C. HOT BOX | 57.09 | 100 |
| 3-A95ES | Adhesive A + B | NO PREBAKE | 2-HR 121° C. HOT BOX | 33.34 | 50 |
| 3-A95ES | Adhesive A + B | NO PREBAKE | 2-HR 121° C. HOT BOX | 58.12 | 100 |
| 3-A95ES | Adhesive A + B | NO PREBAKE | 72-HR UNSTRESSED 80° C. WATER SOAK | 36.04 | 15 |
| 3-A95ES | Adhesive A + B | NO PREBAKE | 72-HR UNSTRESSED 80° C. WATER SOAK | 25.62 | 10 |
| 3-A95ES | Adhesive A + B | NO PREBAKE | 72-HR UNSTRESSED 80° C. WATER SOAK | 26.06 | 15 |
| 3-A95ES | Adhesive A + B | NO PREBAKE | 7-DAY 85° C./85% RH | 51.98 | 10 |
| 3-A95ES | Adhesive A + B | NO PREBAKE | 7-DAY 85° C./85% RH | 49.40 | 95 |
| 3-A95ES | Adhesive A + B | NO PREBAKE | 7-DAY 85° C./85% RH | 45.09 | 95 |
| 2-A85E | Adhesive A + B | NO PREBAKE | PRIMARY | 41.49 | 100 |
| 2-A85E | Adhesive A + B | NO PREBAKE | PRIMARY | 38.09 | 100 |
| 2-A85E | Adhesive A + B | NO PREBAKE | PRIMARY | 35.01 | 100 |
| 2-A85E | Adhesive A + B | NO PREBAKE | 2-HR 93° C. HOT BOX | 12.80 | 100 |
| 2-A85E | Adhesive A + B | NO PREBAKE | 2-HR 93° C. HOT BOX | 13.29 | 100 |
| 2-A85E | Adhesive A + B | NO PREBAKE | 2-HR 93° C. HOT BOX | 12.59 | 100 |
| 2-A85E | Adhesive A + B | NO PREBAKE | 2-HR 121° C. HOT BOX | 2.82 | 100 |
| 2-A85E | Adhesive A + B | NO PREBAKE | 2-HR 121° C. HOT BOX | 3.62 | 100 |
| 2-A85E | Adhesive A + B | NO PREBAKE | 2-HR 121° C. HOT BOX | 3.33 | 95 |
| 2-A85E | Adhesive A + B | NO PREBAKE | 24-HR UNSTRESSED BOILING WATER | 27.62 | 100 |
| 2-A85E | Adhesive A + B | NO PREBAKE | 24-HR UNSTRESSED BOILING WATER | 32.10 | 100 |
| 2-A85E | Adhesive A + B | NO PREBAKE | 72-HR UNSTRESSED 80° C. WATER SOAK | 35.39 | 85 |
| 2-A85E | Adhesive A + B | NO PREBAKE | 72-HR UNSTRESSED 80° C. WATER SOAK | 36.90 | 100 |
| 2-A85E | Adhesive A + B | NO PREBAKE | 72-HR UNSTRESSED 80° C. WATER SOAK | 30.66 | 100 |
| 2-A85E | Adhesive A + B | NO PREBAKE | 7-DAY 85° C./85% RH | 33.62 | 85 |
| 2-A85E | Adhesive A + B | NO PREBAKE | 7-DAY 85° C./85% RH | 42.34 | 100 |
| 2-A85E | Adhesive A + B | NO PREBAKE | 7-DAY 85° C./85% RH | 40.28 | 100 |
| 4-A85ES | Adhesive A + B | NO PREBAKE | PRIMARY | 56.39 | 95 |
| 4-A85ES | Adhesive A + B | NO PREBAKE | PRIMARY | 54.44 | 97 |
| 4-A85ES | Adhesive A + B | NO PREBAKE | PRIMARY | 55.35 | 100 |
| 4-A85ES | Adhesive A + B | NO PREBAKE | 2-HR 93° C. HOT BOX | 28.93 | 100 |
| 4-A85ES | Adhesive A + B | NO PREBAKE | 2-HR 93° C. HOT BOX | 35.65 | 100 |
| 4-A85ES | Adhesive A + B | NO PREBAKE | 2-HR 93° C. HOT BOX | 39.86 | 100 |
| 4-A85ES | Adhesive A + B | NO PREBAKE | 2-HR 121° C. HOT BOX | 32.89 | 100 |
| 4-A85ES | Adhesive A + B | NO PREBAKE | 2-HR 121° C. HOT BOX | 25.69 | 98 |
| 4-A85ES | Adhesive A + B | NO PREBAKE | 2-HR 121° C. HOT BOX | 34.57 | 100 |
| 4-A85ES | Adhesive A + B | NO PREBAKE | 72-HR UNSTRESSED 80° C. WATER SOAK | 30.72 | 0 |
| 4-A85ES | Adhesive A + B | NO PREBAKE | 72-HR UNSTRESSED 80° C. WATER SOAK | 28.37 | 0 |
| 4-A85ES | Adhesive A + B | NO PREBAKE | 72-HR UNSTRESSED 80° C. WATER SOAK | 32.78 | 5 |
| 4-A85ES | Adhesive A + B | NO PREBAKE | 7-DAY 85° C./85% RH | 18.74 | 100 |
| 4-A85ES | Adhesive A + B | NO PREBAKE | 7-DAY 85° C./85% RH | 21.68 | 100 |
| 4-A85ES | Adhesive A + B | NO PREBAKE | 7-DAY 85° C./85% RH | 24.60 | 100 |
| 5-A85ES | Adhesive A + B | NO PREBAKE | PRIMARY | 57.42 | 100 |
| 5-A85ES | Adhesive A + B | NO PREBAKE | PRIMARY | 53.25 | 100 |
| 5-A85ES | Adhesive A + B | NO PREBAKE | PRIMARY | 53.32 | 100 |
| 5-A85ES | Adhesive A + B | NO PREBAKE | 2-HR 93° C. HOT BOX | 28.79 | 100 |
| 5-A85ES | Adhesive A + B | NO PREBAKE | 2-HR 93° C. HOT BOX | 22.71 | 100 |
| 5-A85ES | Adhesive A + B | NO PREBAKE | 2-HR 93° C. HOT BOX | 30.45 | 90 |
| 5-A85ES | Adhesive A + B | NO PREBAKE | 2-HR 121° C. HOT BOX | 13.90 | 100 |
| 5-A85ES | Adhesive A + B | NO PREBAKE | 2-HR 121° C. HOT BOX | 18.35 | 100 |
| 5-A85ES | Adhesive A + B | NO PREBAKE | 2-HR 121° C. HOT BOX | 9.67 | 100 |
| 5-A85ES | Adhesive A + B | NO PREBAKE | 72-HR UNSTRESSED 80° C. WATER SOAK | 25.99 | 15 |
| 5-A85ES | Adhesive A + B | NO PREBAKE | 72-HR UNSTRESSED 80° C. WATER SOAK | 28.18 | 20 |

TABLE 10-continued

| Urethane System | Adhesive | Prebake | Environment | Peak Peel Strength (N/mm) | Total Rubber |
|---|---|---|---|---|---|
| 5-A85ES | Adhesive A + B | NO PREBAKE | 72-HR UNSTRESSED 80° C. WATER SOAK | 23.01 | 20 |
| 5-A85ES | Adhesive A + B | NO PREBAKE | 7-DAY 85° C./85% RH | 21.26 | 15 |
| 5-A85ES | Adhesive A + B | NO PREBAKE | 7-DAY 85° C./85% RH | 20.72 | 15 |
| 5-A85ES | Adhesive A + B | NO PREBAKE | 7-DAY 85° C./85% RH | 24.80 | 10 |
| 6-A85E | Adhesive A + B | NO PREBAKE | PRIMARY | 27.95 | 100 |
| 6-A85E | Adhesive A + B | NO PREBAKE | PRIMARY | 30.26 | 100 |
| 6-A85E | Adhesive A + B | NO PREBAKE | PRIMARY | 26.43 | 100 |
| 6-A85E | Adhesive A + B | NO PREBAKE | 2-HR 93° C. HOT BOX | 21.03 | 100 |
| 6-A85E | Adhesive A + B | NO PREBAKE | 2-HR 93° C. HOT BOX | 20.79 | 100 |
| 6-A85E | Adhesive A + B | NO PREBAKE | 2-HR 93° C. HOT BOX | 13.73 | 100 |
| 6-A85E | Adhesive A + B | NO PREBAKE | 2-HR 121° C. HOT BOX | 2.92 | 100 |
| 6-A85E | Adhesive A + B | NO PREBAKE | 2-HR 121° C. HOT BOX | 7.86 | 100 |
| 6-A85E | Adhesive A + B | NO PREBAKE | 2-HR 121° C. HOT BOX | 13.50 | 100 |
| 6-A85E | Adhesive A + B | NO PREBAKE | 24-HR UNSTRESSED BOILING WATER | 35.22 | 100 |
| 6-A85E | Adhesive A + B | NO PREBAKE | 24-HR UNSTRESSED BOILING WATER | 31.82 | 90 |
| 6-A85E | Adhesive A + B | NO PREBAKE | 24-HR UNSTRESSED BOILING WATER | 21.26 | 100 |
| 6-A85E | Adhesive A + B | NO PREBAKE | 72-HR UNSTRESSED 80° C. WATER SOAK | 27.42 | 100 |
| 6-A85E | Adhesive A + B | NO PREBAKE | 72-HR UNSTRESSED 80° C. WATER SOAK | 22.17 | 100 |
| 6-A85E | Adhesive A + B | NO PREBAKE | 72-HR UNSTRESSED 80° C. WATER SOAK | 23.12 | 100 |
| 6-A85E | Adhesive A + B | NO PREBAKE | 7-DAY 85° C./85% RH | 33.31 | 100 |
| 6-A85E | Adhesive A + B | NO PREBAKE | 7-DAY 85° C./85% RH | 21.01 | 100 |
| 6-A85E | Adhesive A + B | NO PREBAKE | 7-DAY 85° C./85% RH | 30.23 | 85 |
| 7-A90E | Adhesive A + B | NO PREBAKE | PRIMARY | 40.43 | 0 |
| 7-A90E | Adhesive A + B | NO PREBAKE | PRIMARY | 44.92 | 15 |
| 7-A90E | Adhesive A + B | NO PREBAKE | PRIMARY | 42.36 | 15 |
| 7-A90E | Adhesive A + B | NO PREBAKE | 8-HR 171° C. HOT TREE | 32.78 | 100 |
| 7-A90E | Adhesive A + B | NO PREBAKE | 8-HR 171° C. HOT TREE | 31.31 | 100 |
| 7-A90E | Adhesive A + B | NO PREBAKE | 8-HR 171° C. HOT TREE | 23.47 | 100 |
| 7-A90E | Adhesive A + B | NO PREBAKE | PRIMARY | 47.09 | 100 |
| 7-A90E | Adhesive A + B | NO PREBAKE | PRIMARY | 45.69 | 100 |
| 7-A90E | Adhesive A + B | NO PREBAKE | PRIMARY | 34.34 | 100 |
| 7-A90E | Adhesive A + B | NO PREBAKE | 8-HR 171° C. HOT TREE | 36.48 | 100 |
| 7-A90E | Adhesive A + B | NO PREBAKE | 8-HR 171° C. HOT TREE | 47.05 | 100 |
| 7-A90E | Adhesive A + B | NO PREBAKE | 8-HR 171° C. HOT TREE | 46.84 | 100 |
| 8-A90C | Adhesive A + B | NO PREBAKE | PRIMARY | 68.03 | 100 |
| 8-A90C | Adhesive A + B | NO PREBAKE | PRIMARY | 60.40 | 98 |
| 8-A90C | Adhesive A + B | NO PREBAKE | PRIMARY | 59.44 | 100 |
| 8-A90C | Adhesive A + B | NO PREBAKE | 2-HR 149° C. HOT BOX | 40.35 | 100 |
| 8-A90C | Adhesive A + B | NO PREBAKE | 2-HR 149° C. HOT BOX | 42.12 | 75 |
| 8-A90C | Adhesive A + B | NO PREBAKE | 2-HR 149° C. HOT BOX | 38.37 | 50 |
| 1-A95E | Adhesive C | NO PREBAKE | PRIMARY | 86.37 | 100 |
| 1-A95E | Adhesive C | NO PREBAKE | PRIMARY | 73.43 | 100 |
| 1-A95E | Adhesive C | NO PREBAKE | PRIMARY | 70.77 | 100 |
| 1-A95E | Adhesive C | NO PREBAKE | 2-HR 93° C. HOT BOX | 39.49 | 100 |
| 1-A95E | Adhesive C | NO PREBAKE | 2-HR 93° C. HOT BOX | 44.01 | 100 |
| 1-A95E | Adhesive C | NO PREBAKE | 2-HR 93° C. HOT BOX | 26.76 | 95 |
| 1-A95E | Adhesive C | NO PREBAKE | 2-HR 121° C. HOT BOX | 6.25 | 0 |
| 1-A95E | Adhesive C | NO PREBAKE | 2-HR 121° C. HOT BOX | 19.77 | 25 |
| 1-A95E | Adhesive C | NO PREBAKE | 2-HR 121° C. HOT BOX | 6.01 | 5 |
| 1-A95E | Adhesive C | NO PREBAKE | 24-HR UNSTRESSED BOILING WATER | 50.98 | 75 |
| 1-A95E | Adhesive C | NO PREBAKE | 24-HR UNSTRESSED BOILING WATER | 47.32 | 75 |
| 1-A95E | Adhesive C | NO PREBAKE | 24-HR UNSTRESSED BOILING WATER | 44.88 | 70 |
| 1-A95E | Adhesive C | NO PREBAKE | 72-HR UNSTRESSED 80° C. WATER SOAK | 40.66 | 85 |
| 1-A95E | Adhesive C | NO PREBAKE | 72-HR UNSTRESSED 80° C. WATER SOAK | 36.39 | 50 |
| 1-A95E | Adhesive C | NO PREBAKE | 72-HR UNSTRESSED 80° C. WATER SOAK | 35.74 | 50 |
| 1-A95E | Adhesive C | NO PREBAKE | 7-DAY 85° C./85% RH | 44.53 | 90 |
| 1-A95E | Adhesive C | NO PREBAKE | 7-DAY 85° C./85% RH | 40.82 | 100 |
| 1-A95E | Adhesive C | NO PREBAKE | 7-DAY 85° C./85% RH | 46.21 | 80 |
| 3-A95ES | Adhesive C | NO PREBAKE | PRIMARY | 82.10 | 75 |
| 3-A95ES | Adhesive C | NO PREBAKE | PRIMARY | 71.26 | 90 |
| 3-A95ES | Adhesive C | NO PREBAKE | PRIMARY | 82.17 | 100 |
| 3-A95ES | Adhesive C | NO PREBAKE | 2-HR 93° C. HOT BOX | 52.97 | 95 |
| 3-A95ES | Adhesive C | NO PREBAKE | 2-HR 93° C. HOT BOX | 49.91 | 90 |

TABLE 10-continued

| Urethane System | Adhesive | Prebake | Environment | Peak Peel Strength (N/mm) | Total Rubber |
|---|---|---|---|---|---|
| 3-A95ES | Adhesive C | NO PREBAKE | 2-HR 93° C. HOT BOX | 45.44 | 90 |
| 3-A95ES | Adhesive C | NO PREBAKE | 2-HR 121° C. HOT BOX | 35.29 | 90 |
| 3-A95ES | Adhesive C | NO PREBAKE | 2-HR 121° C. HOT BOX | 48.39 | 65 |
| 3-A95ES | Adhesive C | NO PREBAKE | 2-HR 121° C. HOT BOX | 32.61 | 80 |
| 3-A95ES | Adhesive C | NO PREBAKE | 72-HR UNSTRESSED 80° C. WATER SOAK | 27.98 | 0 |
| 3-A95ES | Adhesive C | NO PREBAKE | 72-HR UNSTRESSED 80° C. WATER SOAK | 42.96 | 40 |
| 3-A95ES | Adhesive C | NO PREBAKE | 72-HR UNSTRESSED 80° C. WATER SOAK | 40.94 | 45 |
| 3-A95ES | Adhesive C | NO PREBAKE | 7-DAY 85° C./85% RH | 48.79 | 100 |
| 3-A95ES | Adhesive C | NO PREBAKE | 7-DAY 85° C./85% RH | 39.38 | 100 |
| 3-A95ES | Adhesive C | NO PREBAKE | 7-DAY 85° C./85% RH | 37.16 | 100 |
| 2-A85E | Adhesive C | NO PREBAKE | PRIMARY | 43.50 | 100 |
| 2-A85E | Adhesive C | NO PREBAKE | PRIMARY | 43.78 | 100 |
| 2-A85E | Adhesive C | NO PREBAKE | PRIMARY | 50.00 | 100 |
| 2-A85E | Adhesive C | NO PREBAKE | 2-HR 93° C. HOT BOX | 8.27 | 100 |
| 2-A85E | Adhesive C | NO PREBAKE | 2-HR 93° C. HOT BOX | 9.77 | 100 |
| 2-A85E | Adhesive C | NO PREBAKE | 2-HR 93° C. HOT BOX | 15.53 | 100 |
| 2-A85E | Adhesive C | NO PREBAKE | 2-HR 121° C. HOT BOX | 6.72 | 90 |
| 2-A85E | Adhesive C | NO PREBAKE | 2-HR 121° C. HOT BOX | 9.21 | 92 |
| 2-A85E | Adhesive C | NO PREBAKE | 2-HR 121° C. HOT BOX | 14.53 | 100 |
| 2-A85E | Adhesive C | NO PREBAKE | 24-HR UNSTRESSED BOILING WATER | 19.61 | 10 |
| 2-A85E | Adhesive C | NO PREBAKE | 24-HR UNSTRESSED BOILING WATER | 24.31 | 60 |
| 2-A85E | Adhesive C | NO PREBAKE | 24-HR UNSTRESSED BOILING WATER | 23.34 | 55 |
| 2-A85E | Adhesive C | NO PREBAKE | 72-HR UNSTRESSED 80° C. WATER SOAK | 32.03 | 90 |
| 2-A85E | Adhesive C | NO PREBAKE | 72-HR UNSTRESSED 80° C. WATER SOAK | 32.19 | 100 |
| 2-A85E | Adhesive C | NO PREBAKE | 72-HR UNSTRESSED 80° C. WATER SOAK | 27.72 | 95 |
| 2-A85E | Adhesive C | NO PREBAKE | 7-DAY 85° C./85% RH | 31.84 | 100 |
| 2-A85E | Adhesive C | NO PREBAKE | 7-DAY 85° C./85% RH | 35.39 | 100 |
| 2-A85E | Adhesive C | NO PREBAKE | 7-DAY 85° C./85% RH | 16.58 | 100 |
| 4-A85ES | Adhesive C | NO PREBAKE | PRIMARY | 53.17 | 100 |
| 4-A85ES | Adhesive C | NO PREBAKE | PRIMARY | 58.16 | 95 |
| 4-A85ES | Adhesive C | NO PREBAKE | PRIMARY | 58.96 | 100 |
| 4-A85ES | Adhesive C | NO PREBAKE | 2-HR 93° C. HOT BOX | 27.18 | 90 |
| 4-A85ES | Adhesive C | NO PREBAKE | 2-HR 93° C. HOT BOX | 27.04 | 100 |
| 4-A85ES | Adhesive C | NO PREBAKE | 2-HR 93° C. HOT BOX | 27.14 | 100 |
| 4-A85ES | Adhesive C | NO PREBAKE | 2-HR 121° C. HOT BOX | 22.43 | 95 |
| 4-A85ES | Adhesive C | NO PREBAKE | 2-HR 121° C. HOT BOX | 28.02 | 95 |
| 4-A85ES | Adhesive C | NO PREBAKE | 2-HR 121° C. HOT BOX | 13.03 | 90 |
| 4-A85ES | Adhesive C | NO PREBAKE | 72-HR UNSTRESSED 80° C. WATER SOAK | 24.41 | 5 |
| 4-A85ES | Adhesive C | NO PREBAKE | 72-HR UNSTRESSED 80° C. WATER SOAK | 25.39 | 20 |
| 4-A85ES | Adhesive C | NO PREBAKE | 72-HR UNSTRESSED 80° C. WATER SOAK | 19.89 | 20 |
| 4-A85ES | Adhesive C | NO PREBAKE | 7-DAY 85° C./85% RH | 24.06 | 100 |
| 4-A85ES | Adhesive C | NO PREBAKE | 7-DAY 85° C./85% RH | 15.99 | 100 |
| 4-A85ES | Adhesive C | NO PREBAKE | 7-DAY 85° C./85% RH | 17.34 | 100 |
| 5-A85ES | Adhesive C | NO PREBAKE | PRIMARY | 75.30 | 100 |
| 5-A85ES | Adhesive C | NO PREBAKE | PRIMARY | 72.85 | 100 |
| 5-A85ES | Adhesive C | NO PREBAKE | PRIMARY | 78.66 | 100 |
| 5-A85ES | Adhesive C | NO PREBAKE | 2-HR 93° C. HOT BOX | 28.84 | 100 |
| 5-A85ES | Adhesive C | NO PREBAKE | 2-HR 93° C. HOT BOX | 57.05 | 100 |
| 5-A85ES | Adhesive C | NO PREBAKE | 2-HR 121° C. HOT BOX | 25.50 | 100 |
| 5-A85ES | Adhesive C | NO PREBAKE | 2-HR 121° C. HOT BOX | 25.46 | 100 |
| 5-A85ES | Adhesive C | NO PREBAKE | 2-HR 121° C. HOT BOX | 27.16 | 100 |
| 5-A85ES | Adhesive C | NO PREBAKE | 72-HR UNSTRESSED 80° C. WATER SOAK | 23.17 | 100 |
| 5-A85ES | Adhesive C | NO PREBAKE | 72-HR UNSTRESSED 80° C. WATER SOAK | 26.72 | 100 |
| 5-A85ES | Adhesive C | NO PREBAKE | 72-HR UNSTRESSED 80° C. WATER SOAK | 26.65 | 100 |
| 5-A85ES | Adhesive C | NO PREBAKE | 7-DAY 85° C./85% RH | 38.51 | 100 |
| 5-A85ES | Adhesive C | NO PREBAKE | 7-DAY 85° C./85% RH | 41.36 | 100 |
| 5-A85ES | Adhesive C | NO PREBAKE | 7-DAY 85° C./85% RH | 40.35 | 100 |
| 6-A85E | Adhesive C | NO PREBAKE | PRIMARY | 21.35 | 100 |
| 6-A85E | Adhesive C | NO PREBAKE | PRIMARY | 37.63 | 100 |
| 6-A85E | Adhesive C | NO PREBAKE | PRIMARY | 33.64 | 100 |
| 6-A85E | Adhesive C | NO PREBAKE | 2-HR 93° C. HOT BOX | 12.92 | 100 |

TABLE 10-continued

| Urethane System | Adhesive | Prebake | Environment | Peak Peel Strength (N/mm) | Total Rubber |
|---|---|---|---|---|---|
| 6-A85E | Adhesive C | NO PREBAKE | 2-HR 93° C. HOT BOX | 12.24 | 100 |
| 6-A85E | Adhesive C | NO PREBAKE | 2-HR 93° C. HOT BOX | 16.76 | 100 |
| 6-A85E | Adhesive C | NO PREBAKE | 2-HR 121° C. HOT BOX | 10.45 | 100 |
| 6-A85E | Adhesive C | NO PREBAKE | 2-HR 121° C. HOT BOX | 9.42 | 100 |
| 6-A85E | Adhesive C | NO PREBAKE | 2-HR 121° C. HOT BOX | 9.81 | 100 |
| 6-A85E | Adhesive C | NO PREBAKE | 24-HR UNSTRESSED BOILING WATER | 17.30 | 85 |
| 6-A85E | Adhesive C | NO PREBAKE | 24-HR UNSTRESSED BOILING WATER | 10.44 | 100 |
| 6-A85E | Adhesive C | NO PREBAKE | 24-HR UNSTRESSED BOILING WATER | 19.82 | 85 |
| 6-A85E | Adhesive C | NO PREBAKE | 72-HR UNSTRESSED 80° C. WATER SOAK | 16.06 | 95 |
| 6-A85E | Adhesive C | NO PREBAKE | 72-HR UNSTRESSED 80° C. WATER SOAK | 18.55 | 95 |
| 6-A85E | Adhesive C | NO PREBAKE | 72-HR UNSTRESSED 80° C. WATER SOAK | 27.04 | 100 |
| 6-A85E | Adhesive C | NO PREBAKE | 7-DAY 85° C./85% RH | 26.27 | 100 |
| 6-A85E | Adhesive C | NO PREBAKE | 7-DAY 85° C./85% RH | 28.46 | 100 |
| 6-A85E | Adhesive C | NO PREBAKE | 7-DAY 85° C./85% RH | 31.57 | 100 |
| 1-A95E | 106A | NO PREBAKE | PRIMARY | 66.70249 | 100 |
| 1-A95E | 106A | NO PREBAKE | PRIMARY | 51.50224 | 100 |
| 1-A95E | 106A | NO PREBAKE | PRIMARY | 60.048 | 100 |
| 1-A95E | 106A | NO PREBAKE | 2-HR 93° C. HOT BOX | 48.928 | 100 |
| 1-A95E | 106A | NO PREBAKE | 2-HR 93° C. HOT BOX | 40.87257 | 100 |
| 1-A95E | 106A | NO PREBAKE | 2-HR 93° C. HOT BOX | 38.61354 | 100 |
| 1-A95E | 106A | NO PREBAKE | 2-HR 121° C. HOT BOX | 4.763213 | 0 |
| 1-A95E | 106A | NO PREBAKE | 2-HR 121° C. HOT BOX | 0 | 0 |
| 1-A95E | 106A | NO PREBAKE | 2-HR 121° C. HOT BOX | 33.76277 | 98 |
| 1-A95E | 106A | NO PREBAKE | 24-HR UNSTRESSED BOILING WATER | 33.78028 | 0 |
| 1-A95E | 106A | NO PREBAKE | 24-HR UNSTRESSED BOILING WATER | 41.13524 | 5 |
| 1-A95E | 106A | NO PREBAKE | 24-HR UNSTRESSED BOILING WATER | 39.06885 | 5 |
| 1-A95E | 106A | NO PREBAKE | 72-HR UNSTRESSED 80° C. WATER SOAK | 0 | 0 |
| 1-A95E | 106A | NO PREBAKE | 72-HR UNSTRESSED 80° C. WATER SOAK | 5.586268 | 0 |
| 1-A95E | 106A | NO PREBAKE | 72-HR UNSTRESSED 80° C. WATER SOAK | 8.160504 | 0 |
| 1-A95E | 106A | NO PREBAKE | 7-DAY 85° C./85% RH | 38.21077 | 100 |
| 1-A95E | 106A | NO PREBAKE | 7-DAY 85° C./85% RH | 47.40447 | 100 |
| 1-A95E | 106A | NO PREBAKE | 7-DAY 85° C./85% RH | 45.19798 | 100 |
| 3-A95ES | 106A | NO PREBAKE | PRIMARY | 79.97644 | 75 |
| 3-A95ES | 106A | NO PREBAKE | PRIMARY | 74.2851 | 60 |
| 3-A95ES | 106A | NO PREBAKE | PRIMARY | 72.44636 | 65 |
| 3-A95ES | 106A | NO PREBAKE | 2-HR 93° C. HOT BOX | 52.20271 | 90 |
| 3-A95ES | 106A | NO PREBAKE | 2-HR 93° C. HOT BOX | 42.79887 | 75 |
| 3-A95ES | 106A | NO PREBAKE | 2-HR 93° C. HOT BOX | 29.87515 | 20 |
| 3-A95ES | 106A | NO PREBAKE | 2-HR 121° C. HOT BOX | 25.42715 | 30 |
| 3-A95ES | 106A | NO PREBAKE | 2-HR 121° C. HOT BOX | 26.18016 | 25 |
| 3-A95ES | 106A | NO PREBAKE | 2-HR 121° C. HOT BOX | 33.97291 | 35 |
| 3-A95ES | 106A | NO PREBAKE | 72-HR UNSTRESSED 80° C. WATER SOAK | 19.15792 | 0 |
| 3-A95ES | 106A | NO PREBAKE | 72-HR UNSTRESSED 80° C. WATER SOAK | 5.533732 | 0 |
| 3-A95ES | 106A | NO PREBAKE | 72-HR UNSTRESSED 80° C. WATER SOAK | 12.50343 | 0 |
| 3-A95ES | 106A | NO PREBAKE | 7-DAY 85° C./85% RH | 30.15534 | 20 |
| 3-A95ES | 106A | NO PREBAKE | 7-DAY 85° C./85% RH | 39.89191 | 100 |
| 3-A95ES | 106A | NO PREBAKE | 7-DAY 85° C./85% RH | 48.17499 | 100 |
| 2-A85E | 106A | NO PREBAKE | PRIMARY | 16.21594 | 100 |
| 2-A85E | 106A | NO PREBAKE | PRIMARY | 8.213039 | 100 |
| 2-A85E | 106A | NO PREBAKE | PRIMARY | 3.519874 | 100 |
| 2-A85E | 106A | NO PREBAKE | 2-HR 93° C. HOT BOX | 14.30715 | 100 |
| 2-A85E | 106A | NO PREBAKE | 2-HR 93° C. HOT BOX | 11.29512 | 100 |
| 2-A85E | 106A | NO PREBAKE | 2-HR 121° C. HOT BOX | 9.386331 | 95 |
| 2-A85E | 106A | NO PREBAKE | 2-HR 121° C. HOT BOX | 13.25644 | 92 |
| 2-A85E | 106A | NO PREBAKE | 24-HR UNSTRESSED BOILING WATER | 6.689512 | 0 |
| 2-A85E | 106A | NO PREBAKE | 24-HR UNSTRESSED BOILING WATER | 8.405669 | 0 |
| 2-A85E | 106A | NO PREBAKE | 24-HR UNSTRESSED BOILING WATER | 8.12548 | 0 |

TABLE 10-continued

| Urethane System | Adhesive | Prebake | Environment | Peak Peel Strength (N/mm) | Total Rubber |
|---|---|---|---|---|---|
| 2-A85E | 106A | NO PREBAKE | 72-HR UNSTRESSED 80° C. WATER SOAK | 9.176189 | 95 |
| 2-A85E | 106A | NO PREBAKE | 72-HR UNSTRESSED 80° C. WATER SOAK | 10.19187 | 0 |
| 2-A85E | 106A | NO PREBAKE | 7-DAY 85° C./85% RH | 35.8817 | 100 |
| 2-A85E | 106A | NO PREBAKE | 7-DAY 85° C./85% RH | 30.22539 | 100 |
| 2-A85E | 106A | NO PREBAKE | 7-DAY 85° C./85% RH | 28.05392 | 100 |
| 4-A85ES | 106A | NO PREBAKE | PRIMARY | 57.57883 | 100 |
| 4-A85ES | 106A | NO PREBAKE | PRIMARY | 58.1217 | 97 |
| 4-A85ES | 106A | NO PREBAKE | PRIMARY | 54.67187 | 100 |
| 4-A85ES | 106A | NO PREBAKE | 2-HR 93° C. HOT BOX | 22.27502 | 73 |
| 4-A85ES | 106A | NO PREBAKE | 2-HR 93° C. HOT BOX | 39.17392 | 100 |
| 4-A85ES | 106A | NO PREBAKE | 2-HR 93° C. HOT BOX | 22.57272 | 100 |
| 4-A85ES | 106A | NO PREBAKE | 2-HR 121° C. HOT BOX | 29.40233 | 90 |
| 4-A85ES | 106A | NO PREBAKE | 2-HR 121° C. HOT BOX | 17.40674 | 85 |
| 4-A85ES | 106A | NO PREBAKE | 2-HR 121° C. HOT BOX | 13.95691 | 45 |
| 4-A85ES | 106A | NO PREBAKE | 72-HR UNSTRESSED 80° C. WATER SOAK | 24.72668 | 0 |
| 4-A85ES | 106A | NO PREBAKE | 72-HR UNSTRESSED 80° C. WATER SOAK | 26.53039 | 0 |
| 4-A85ES | 106A | NO PREBAKE | 72-HR UNSTRESSED 80° C. WATER SOAK | 26.86312 | 0 |
| 4-A85ES | 106A | NO PREBAKE | 7-DAY 85° C./85% RH | 20.83906 | 100 |
| 4-A85ES | 106A | NO PREBAKE | 7-DAY 85° C./85% RH | 21.0492 | 100 |
| 4-A85ES | 106A | NO PREBAKE | 7-DAY 85° C./85% RH | 21.32939 | 100 |
| 5-A85ES | 106A | NO PREBAKE | PRIMARY | 60.9411 | 100 |
| 5-A85ES | 106A | NO PREBAKE | PRIMARY | 58.66457 | 100 |
| 5-A85ES | 106A | NO PREBAKE | PRIMARY | 50.08378 | 100 |
| 5-A85ES | 106A | NO PREBAKE | 2-HR 93° C. HOT BOX | 26.05757 | 95 |
| 5-A85ES | 106A | NO PREBAKE | 2-HR 93° C. HOT BOX | 21.45197 | 95 |
| 5-A85ES | 106A | NO PREBAKE | 2-HR 93° C. HOT BOX | 20.10356 | 95 |
| 5-A85ES | 106A | NO PREBAKE | 2-HR 121° C. HOT BOX | 7.24989 | 50 |
| 5-A85ES | 106A | NO PREBAKE | 2-HR 121° C. HOT BOX | 12.59099 | 90 |
| 5-A85ES | 106A | NO PREBAKE | 2-HR 121° C. HOT BOX | 12.76611 | 75 |
| 5-A85ES | 106A | NO PREBAKE | 72-HR UNSTRESSED 80° C. WATER SOAK | 31.71389 | 30 |
| 5-A85ES | 106A | NO PREBAKE | 72-HR UNSTRESSED 80° C. WATER SOAK | 35.04113 | 90 |
| 5-A85ES | 106A | NO PREBAKE | 72-HR UNSTRESSED 80° C. WATER SOAK | 33.72775 | 85 |
| 5-A85ES | 106A | NO PREBAKE | 7-DAY 85° C./85% RH | 30.5406 | 100 |
| 5-A85ES | 106A | NO PREBAKE | 7-DAY 85° C./85% RH | 32.50192 | 100 |
| 5-A85ES | 106A | NO PREBAKE | 7-DAY 85° C./85% RH | 26.688 | 95 |
| 6-A85E | 106A | NO PREBAKE | PRIMARY | 39.15641 | 100 |
| 6-A85E | 106A | NO PREBAKE | PRIMARY | 35.35635 | 100 |
| 6-A85E | 106A | NO PREBAKE | PRIMARY | 31.67887 | 100 |
| 6-A85E | 106A | NO PREBAKE | 2-HR 93° C. HOT BOX | 13.13386 | 100 |
| 6-A85E | 106A | NO PREBAKE | 2-HR 93° C. HOT BOX | 18.12472 | 100 |
| 6-A85E | 106A | NO PREBAKE | 2-HR 93° C. HOT BOX | 16.37354 | 100 |
| 6-A85E | 106A | NO PREBAKE | 2-HR 121° C. HOT BOX | 16.21594 | 100 |
| 6-A85E | 106A | NO PREBAKE | 2-HR 121° C. HOT BOX | 12.94123 | 100 |
| 6-A85E | 106A | NO PREBAKE | 2-HR 121° C. HOT BOX | 14.44724 | 100 |
| 6-A85E | 106A | NO PREBAKE | 24-HR UNSTRESSED BOILING WATER | 21.08422 | 80 |
| 6-A85E | 106A | NO PREBAKE | 24-HR UNSTRESSED BOILING WATER | 28.03641 | 80 |
| 6-A85E | 106A | NO PREBAKE | 24-HR UNSTRESSED BOILING WATER | 29.52491 | 85 |
| 6-A85E | 106A | NO PREBAKE | 72-HR UNSTRESSED 80° C. WATER SOAK | 25.7949 | 95 |
| 6-A85E | 106A | NO PREBAKE | 72-HR UNSTRESSED 80° C. WATER SOAK | 21.2068 | 95 |
| 6-A85E | 106A | NO PREBAKE | 72-HR UNSTRESSED 80° C. WATER SOAK | 30.36548 | 95 |
| 6-A85E | 106A | NO PREBAKE | 7-DAY 85° C./85% RH | 40.18961 | 100 |
| 6-A85E | 106A | NO PREBAKE | 7-DAY 85° C./85% RH | 40.67994 | 100 |
| 6-A85E | 106A | NO PREBAKE | 7-DAY 85° C./85% RH | 31.25858 | 100 |
| 1-A95E | 106C | NO PREBAKE | PRIMARY | 69.41682 | 100 |
| 1-A95E | 106C | NO PREBAKE | PRIMARY | 67.21033 | 100 |
| 1-A95E | 106C | NO PREBAKE | PRIMARY | 72.44636 | 100 |
| 1-A95E | 106C | NO PREBAKE | 2-HR 93° C. HOT BOX | 41.2228 | 100 |
| 1-A95E | 106C | NO PREBAKE | 2-HR 93° C. HOT BOX | 42.23849 | 100 |
| 1-A95E | 106C | NO PREBAKE | 2-HR 93° C. HOT BOX | 46.17865 | 100 |
| 1-A95E | 106C | NO PREBAKE | 2-HR 121° C. HOT BOX | 6.269228 | 0 |
| 1-A95E | 106C | NO PREBAKE | 2-HR 121° C. HOT BOX | 9.158677 | 0 |
| 1-A95E | 106C | NO PREBAKE | 2-HR 121° C. HOT BOX | 5.446173 | 0 |

TABLE 10-continued

| Urethane System | Adhesive | Prebake | Environment | Peak Peel Strength (N/mm) | Total Rubber |
|---|---|---|---|---|---|
| 1-A95E | 106C | NO PREBAKE | 24-HR UNSTRESSED BOILING WATER | 35.26879 | 40 |
| 1-A95E | 106C | NO PREBAKE | 24-HR UNSTRESSED BOILING WATER | 1.961323 | 20 |
| 1-A95E | 106C | NO PREBAKE | 24-HR UNSTRESSED BOILING WATER | 33.44756 | 40 |
| 1-A95E | 106C | NO PREBAKE | 72-HR UNSTRESSED 80° C. WATER SOAK | 8.755906 | 0 |
| 1-A95E | 106C | NO PREBAKE | 72-HR UNSTRESSED 80° C. WATER SOAK | 5.008378 | 0 |
| 1-A95E | 106C | NO PREBAKE | 72-HR UNSTRESSED 80° C. WATER SOAK | 6.251717 | 0 |
| 1-A95E | 106C | NO PREBAKE | 7-DAY 85° C./85% RH | 52.92069 | 75 |
| 1-A95E | 106C | NO PREBAKE | 7-DAY 85° C./85% RH | 44.81272 | 100 |
| 1-A95E | 106C | NO PREBAKE | 7-DAY 85° C./85% RH | 59.47011 | 80 |
| 3-A95ES | 106C | NO PREBAKE | PRIMARY | 89.78306 | 100 |
| 3-A95ES | 106C | NO PREBAKE | PRIMARY | 79.31099 | 100 |
| 3-A95ES | 106C | NO PREBAKE | PRIMARY | 79.31099 | 100 |
| 3-A95ES | 106C | NO PREBAKE | 2-HR 93° C. HOT BOX | 51.55477 | 90 |
| 3-A95ES | 106C | NO PREBAKE | 2-HR 93° C. HOT BOX | 51.92252 | 90 |
| 3-A95ES | 106C | NO PREBAKE | 2-HR 93° C. HOT BOX | 47.45701 | 80 |
| 3-A95ES | 106C | NO PREBAKE | 2-HR 121° C. HOT BOX | 3.589921 | 0 |
| 3-A95ES | 106C | NO PREBAKE | 2-HR 121° C. HOT BOX | 4.938331 | 40 |
| 3-A95ES | 106C | NO PREBAKE | 2-HR 121° C. HOT BOX | 8.843465 | 15 |
| 3-A95ES | 106C | NO PREBAKE | 72-HR UNSTRESSED 80° C. WATER SOAK | 0 | 5 |
| 3-A95ES | 106C | NO PREBAKE | 72-HR UNSTRESSED 80° C. WATER SOAK | 0 | 0 |
| 3-A95ES | 106C | NO PREBAKE | 72-HR UNSTRESSED 80° C. WATER SOAK | 13.29146 | 0 |
| 3-A95ES | 106C | NO PREBAKE | 7-DAY 85° C./85% RH | 40.15458 | 100 |
| 3-A95ES | 106C | NO PREBAKE | 7-DAY 85° C./85% RH | 40.85506 | 100 |
| 3-A95ES | 106C | NO PREBAKE | 7-DAY 85° C./85% RH | 41.15276 | 100 |
| 2-A85E | 106C | NO PREBAKE | PRIMARY | 19.19294 | 100 |
| 2-A85E | 106C | NO PREBAKE | PRIMARY | 37.44025 | 100 |
| 2-A85E | 106C | NO PREBAKE | PRIMARY | 16.39106 | 100 |
| 2-A85E | 106C | NO PREBAKE | 2-HR 93° C. HOT BOX | 13.67672 | 100 |
| 2-A85E | 106C | NO PREBAKE | 2-HR 93° C. HOT BOX | 14.41222 | 100 |
| 2-A85E | 106C | NO PREBAKE | 2-HR 93° C. HOT BOX | 18.29984 | 100 |
| 2-A85E | 106C | NO PREBAKE | 2-HR 121° C. HOT BOX | 14.92006 | 92 |
| 2-A85E | 106C | NO PREBAKE | 2-HR 121° C. HOT BOX | 4.903307 | 0 |
| 2-A85E | 106C | NO PREBAKE | 2-HR 121° C. HOT BOX | 5.358614 | 7 |
| 2-A85E | 106C | NO PREBAKE | 24-HR UNSTRESSED BOILING WATER | 7.985386 | 0 |
| 2-A85E | 106C | NO PREBAKE | 24-HR UNSTRESSED BOILING WATER | 5.60378 | 0 |
| 2-A85E | 106C | NO PREBAKE | 24-HR UNSTRESSED BOILING WATER | 6.707024 | 0 |
| 2-A85E | 106C | NO PREBAKE | 72-HR UNSTRESSED 80° C. WATER SOAK | 9.08863 | 0 |
| 2-A85E | 106C | NO PREBAKE | 72-HR UNSTRESSED 80° C. WATER SOAK | 6.952189 | 0 |
| 2-A85E | 106C | NO PREBAKE | 72-HR UNSTRESSED 80° C. WATER SOAK | 17.89707 | 25 |
| 2-A85E | 106C | NO PREBAKE | 7-DAY 85° C./85% RH | 29.33228 | 100 |
| 2-A85E | 106C | NO PREBAKE | 7-DAY 85° C./85% RH | 26.70551 | 100 |
| 2-A85E | 106C | NO PREBAKE | 7-DAY 85° C./85% RH | 35.1462 | 100 |
| 4-A85ES | 106C | NO PREBAKE | PRIMARY | 51.72989 | 100 |
| 4-A85ES | 106C | NO PREBAKE | PRIMARY | 63.63792 | 90 |
| 4-A85ES | 106C | NO PREBAKE | PRIMARY | 58.68208 | 80 |
| 4-A85ES | 106C | NO PREBAKE | 2-HR 93° C. HOT BOX | 39.83937 | 100 |
| 4-A85ES | 106C | NO PREBAKE | 2-HR 93° C. HOT BOX | 45.05789 | 100 |
| 4-A85ES | 106C | NO PREBAKE | 2-HR 93° C. HOT BOX | 38.29833 | 100 |
| 4-A85ES | 106C | NO PREBAKE | 2-HR 121° C. HOT BOX | 6.672 | 0 |
| 4-A85ES | 106C | NO PREBAKE | 2-HR 121° C. HOT BOX | 32.95723 | 90 |
| 4-A85ES | 106C | NO PREBAKE | 2-HR 121° C. HOT BOX | 4.570583 | 0 |
| 4-A85ES | 106C | NO PREBAKE | 72-HR UNSTRESSED 80° C. WATER SOAK | 12.36334 | 30 |
| 4-A85ES | 106C | NO PREBAKE | 72-HR UNSTRESSED 80° C. WATER SOAK | 5.883969 | 0 |
| 4-A85ES | 106C | NO PREBAKE | 72-HR UNSTRESSED 80° C. WATER SOAK | 14.5348 | 20 |
| 4-A85ES | 106C | NO PREBAKE | 7-DAY 85° C./85% RH | 25.32208 | 100 |
| 4-A85ES | 106C | NO PREBAKE | 7-DAY 85° C./85% RH | 21.95981 | 100 |
| 4-A85ES | 106C | NO PREBAKE | 7-DAY 85° C./85% RH | 23.2732 | 100 |
| 5-A85ES | 106C | NO PREBAKE | PRIMARY | 74.4252 | 75 |

TABLE 10-continued

| Urethane System | Adhesive | Prebake | Environment | Peak Peel Strength (N/mm) | Total Rubber |
|---|---|---|---|---|---|
| 5-A85ES | 106C | NO PREBAKE | PRIMARY | 60.59087 | 75 |
| 5-A85ES | 106C | NO PREBAKE | PRIMARY | 63.02501 | 75 |
| 5-A85ES | 106C | NO PREBAKE | 2-HR 93° C. HOT BOX | 26.49537 | 100 |
| 5-A85ES | 106C | NO PREBAKE | 2-HR 93° C. HOT BOX | 17.792 | 100 |
| 5-A85ES | 106C | NO PREBAKE | 2-HR 93° C. HOT BOX | 18.35238 | 90 |
| 5-A85ES | 106C | NO PREBAKE | 2-HR 121° C. HOT BOX | 16.49613 | 100 |
| 5-A85ES | 106C | NO PREBAKE | 2-HR 121° C. HOT BOX | 14.93757 | 95 |
| 5-A85ES | 106C | NO PREBAKE | 2-HR 121° C. HOT BOX | 13.50161 | 97 |
| 5-A85ES | 106C | NO PREBAKE | 72-HR UNSTRESSED 80° C. WATER SOAK | 19.75332 | 80 |
| 5-A85ES | 106C | NO PREBAKE | 72-HR UNSTRESSED 80° C. WATER SOAK | 19.56069 | 70 |
| 5-A85ES | 106C | NO PREBAKE | 72-HR UNSTRESSED 80° C. WATER SOAK | 17.82702 | 80 |
| 5-A85ES | 106C | NO PREBAKE | 7-DAY 85° C./85% RH | 10.48957 | 100 |
| 5-A85ES | 106C | NO PREBAKE | 7-DAY 85° C./85% RH | 17.1966 | 100 |
| 5-A85ES | 106C | NO PREBAKE | 7-DAY 85° C./85% RH | 11.89052 | 100 |
| 6-A85E | 106C | NO PREBAKE | PRIMARY | 38.92876 | 100 |
| 6-A85E | 106C | NO PREBAKE | PRIMARY | 41.97581 | 100 |
| 6-A85E | 106C | NO PREBAKE | PRIMARY | 57.0885 | 100 |
| 6-A85E | 106C | NO PREBAKE | 2-HR 93° C. HOT BOX | 21.24183 | 100 |
| 6-A85E | 106C | NO PREBAKE | 2-HR 93° C. HOT BOX | 17.23162 | 100 |
| 6-A85E | 106C | NO PREBAKE | 2-HR 93° C. HOT BOX | 22.08239 | 100 |
| 6-A85E | 106C | NO PREBAKE | 2-HR 121° C. HOT BOX | 16.91641 | 100 |
| 6-A85E | 106C | NO PREBAKE | 2-HR 121° C. HOT BOX | 12.57348 | 93 |
| 6-A85E | 106C | NO PREBAKE | 2-HR 121° C. HOT BOX | 4.780724 | 30 |
| 6-A85E | 106C | NO PREBAKE | 24-HR UNSTRESSED BOILING WATER | 11.48775 | 85 |
| 6-A85E | 106C | NO PREBAKE | 24-HR UNSTRESSED BOILING WATER | 9.351307 | 10 |
| 6-A85E | 106C | NO PREBAKE | 72-HR UNSTRESSED 80° C. WATER SOAK | 26.35528 | 100 |
| 6-A85E | 106C | NO PREBAKE | 72-HR UNSTRESSED 80° C. WATER SOAK | 23.4308 | 35 |
| 6-A85E | 106C | NO PREBAKE | 72-HR UNSTRESSED 80° C. WATER SOAK | 6.689512 | 10 |
| 6-A85E | 106C | NO PREBAKE | 7-DAY 85° C./85% RH | 42.65877 | 90 |
| 6-A85E | 106C | NO PREBAKE | 7-DAY 85° C./85% RH | 30.89083 | 100 |
| 6-A85E | 106C | NO PREBAKE | 7-DAY 85° C./85% RH | 24.27137 | 25 |
| 3-A95ES | Adhesive A | NO PREBAKE | 72-HR UNSTRESSED 80° C. WATER SOAK | 48.53 | 35 |

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An adhesive comprising:
a phenoxy resin grafted with methyl methacrylate (MMA) and/or methacrylic acid (MAA);
a uretdione or a silane; and
a blocked hexamethylene diisocyanate (HDI), optionally wherein the HDI comprises diethylmalonate blocked biuret of HDI.

2. The adhesive of claim 1, wherein:
the silane comprises at least one of an epoxy-, amino-, mercapto-, and/or isocyanato-silane; or
the silane comprises glycidoxy propyltrimethoxy silane; or
the uretdione comprises a uretdione of methylene diphenyl diisocyanate (MDI); or
the adhesive does not contain a catalyst; or
the adhesive is substantially absent free isocyanate; or
the adhesive requires no prebake to achieve 100% rubber retention and greater than 150 PLI after hot testing at 300° F. for a 2-hour soak pulled hot in the hot box (ASTM D429 Method B).

3. The adhesive of claim 1, further comprising:
trimethylol propane; or
cyclohexanone as a carrier fluid.

4. The adhesive of claim 1, further comprising a catalyst, optionally wherein the catalyst is a metal acetylacetonate.

5. The adhesive of claim 4, wherein:
the metal acetylacetonate comprises at least one of zinc, aluminum, or zirconium acetylacetonate; or
the catalyst comprises at least one of 2-ethylhexyl titanium acetylacetonate, titanium phosphate complex, or titanium acetylacetonate.

6. The adhesive of claim 1, wherein the phenoxy resin grafted with MMA and/or MAA works with the uretdione or silane to form crosslinking.

7. The adhesive of claim 6, wherein the adhesive is configured to chemisorb to a metal surface, diffuse and entangle in a urethane elastomer and/or provide crossbridging and/or crosslinking across an interface of the adhesive and a cast urethane.

8. The adhesive of claim 1, wherein the adhesive is capable of bonding a castable urethane to a substrate.

9. The adhesive of claim 8, wherein the substrate comprises a metallic substrate.

10. A method of adhering a castable urethane to a substrate, the method comprising:
applying the adhesive of claim 1 and the castable urethane to the substrate.

11. The method of claim 10, wherein applying the adhesive comprises spraying, brushing, dipping, and/or rolling the adhesive on the substrate.

12. The method of claim 11, wherein:
the adhesive is sprayed onto the substrate;
the adhesive is sprayed at about 0.75 to about 1.1 mils dry film thickness (DFT) on the substrate at about 150° F. to about 180° F. for about 15-20 minutes; and
the substrate is a clean pre-heated metal substrate.

13. The method of claim 10, wherein:
the substrate comprises a grit blasted steel (GBS) component; or
the castable urethane is bonded to the substrate after application of the adhesive, comprising hot molding followed by curing.

14. The method of claim 10, further comprising an initial cure of about 260° F. for 30 minutes, and a post cure of about 16 hours at about 284° F.

15. An adhesive comprising:
a phenoxy resin grafted with methyl methacrylate (MMA) and/or methacrylic acid (MAA);
a uretdione or a silane; and
trimethyl propane.

16. The adhesive of claim 1, wherein:
the silane comprises at least one of an epoxy-, amino-, mercapto-, and/or isocyanato-silane; or
the silane comprises glycidoxy propyltrimethoxy silane; or
the uretdione comprises a uretdione of methylene diphenyl diisocyanate (MDI); or
the adhesive does not contain a catalyst; or
the adhesive is substantially absent free isocyanate or
the adhesive requires no prebake to achieve 100% rubber retention and greater than 150 PLI after hot testing at 300° F. for a 2-hour soak pulled hot in the hot box (ASTM D429 Method B).

17. The adhesive of claim 15, further comprising a catalyst, optionally wherein the catalyst is a metal acetylacetonate.

18. The adhesive of claim 17, wherein:
the metal acetylacetonate comprises at least one of zinc, aluminum, or zirconium acetylacetonate; or
the catalyst comprises at least one of 2-ethylhexyl titanium acetylacetonate, titanium phosphate complex, or titanium acetylacetonate.

19. The adhesive of claim 15, further comprising cyclohexanone as a carrier fluid.

20. The adhesive of claim 15, wherein the phenoxy resin grafted with MMA and/or MAA works with the uretdione or silane to form crosslinking.

21. The adhesive of claim 20, wherein the adhesive is configured to chemisorb to a metal surface, diffuse and entangle in a urethane elastomer and/or provide crossbridging and/or crosslinking across an interface of the adhesive and a cast urethane.

22. The adhesive of claim 15, wherein the adhesive is capable of bonding a castable urethane to a substrate.

23. The adhesive of claim 22, wherein the substrate comprises a metallic substrate.

* * * * *